United States Patent [19]

Higgins et al.

[11] 4,436,855

[45] Mar. 13, 1984

[54] TWO-COMPONENT URETHANE COATING SYSTEM

[75] Inventors: William A. Higgins, Gates Mills; John S. Perz, Mentor, both of Ohio

[73] Assignee: The Lubrizol Corporation, Wickliffe, Ohio

[21] Appl. No.: 508,992

[22] Filed: Jun. 29, 1983

Related U.S. Application Data

[63] Continuation of Ser. No. 376,821, May 12, 1982, abandoned.

[51] Int. Cl.³ .............................................. C08K 5/52
[52] U.S. Cl. .................................. 524/145; 524/141; 524/590
[58] Field of Search ............... 524/161, 162, 166, 394, 524/400, 420, 425, 590, 141, 142, 143, 144, 145

[56] References Cited

U.S. PATENT DOCUMENTS

| | | | |
|---|---|---|---|
| 2,616,904 | 11/1952 | Asseff | 260/399 |
| 2,695,910 | 11/1954 | Asseff | 260/413 |
| 2,777,874 | 1/1957 | Asseff | 260/504 |
| 3,055,865 | 9/1962 | Craig | 260/47 |
| 3,133,838 | 5/1964 | Higgins | 148/6.15 |
| 3,242,079 | 3/1966 | McMillan | 252/33 |
| 3,384,586 | 5/1968 | McMillen | 524/425 |
| 3,453,124 | 7/1969 | Wurstner | 106/14 |
| 3,492,231 | 1/1970 | McMillen | 524/394 |
| 4,230,586 | 10/1980 | Bretz | 252/8.5 |
| 4,264,363 | 4/1981 | Cech | 106/14.28 |

OTHER PUBLICATIONS

Higgins et al., "Sulfonate and Phosphate Chemistry to Improve Corrosion Inhibition and Adhesion", 59th Annual Meeting of the Federation of Societies for Coating Technology, Cobo Hall, Detroit, Michigan, Oct. 28–30, 1981.
T. C. Patton, "Urethane (Isocyanate Compounds) Part I—Urethane Coatings Survey", Official Digest, Mar. 1962, pp. 342–365.
K. A. Pigott, "Urethane Polymers", Kirk–Othmer Encyclopedia of Chemical Technology, vol. 21, pp. 100–106 (2nd Ed., John Wiley and Sons, Inc.).

*Primary Examiner*—Paul R. Michl
*Attorney, Agent, or Firm*—D. A. Polyn; R. F. Keller

[57] ABSTRACT

The present invention contemplates the provision of two-component urethane coating compositions comprising a first component comprising an organic polyfunctional isocyanate, and a second component comprising an acidic ester of a phosphoric acid, the alcohol portions of said acidic acid being selected from the group consisting of hydrocarbyloxy and hydroxy-substituted hydrocarbyloxy compounds, such compositions providing enhanced corrosion resistance properties as well as improved flame retardency and metal adhesion characteristics over the two-component urethane systems of the prior art. An essential ingredient in the compositions of the invention is a non-Newtonian colloidal disperse system which can be provided with either the first component and/or the second component parts of the compositions of the invention. The non-Newtonian colloidal disperse systems provided in accordance with the present invention comprise (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions. The invention also relates to a method of coating a substrate comprising mixing the foregoing components and depositing the resulting composition on said substrate.

79 Claims, No Drawings

TWO-COMPONENT URETHANE COATING SYSTEM

This application is a continuation of application Ser. No. 376,821, filed May 12, 1982, now abandoned.

TECHNICAL FIELD

This invention relates to coatings and, more particularly, to two-component urethane coatings characterized by non-Newtonian rheological properties. Specifically, the invention relates to two-component urethane coatings comprising as an essential constituent a non-Newtonian colloidal disperse system.

BACKGROUND OF THE INVENTION

Non-Newtonian colloidal disperse systems comprising solid metal-containing colloidal particles predispersed in a disperse medium of at least one inert organic liquid and a third component selected from the class consisting of organic compounds which are substantially insoluble in said disperse medium are known. See, for example, U.S. Pat. Nos. 3,384,586; 3,453,124; 3,492,231; 4,230,586; and 4,264,363.

Two-component urethane coating systems wherein one component is a polyisocyanate and the other component is a polyol dispersed in solvents which evaporate after application of the coating are known. See, for example, "Polyurethanes: Chemistry and Technology, II. Technology", J. H. Saunders and K. C. Frisch, Interscience Publishers, Library of Congress Catalog Card No. 62-18932, pp. 453-607.

Acidic esters of phosphoric acids are a well known class of organic compounds which are derived from phosphorus containing reactants such as phosphorus pentoxide, phosphorus oxychloride, phosphoric acids, polyphosphoric acids, etc., and an alcoholic or phenolic compound of the type ROH according to known procedures. See, for example, U.S. Pat. No. 3,453,124.

A problem with currently available two-component urethane coating systems is their inability to provide acceptable levels of corrosion resistance for certain applications. It would be advantageous to provide a two-component urethane coating system that provided an enhanced level of corrosion resistance as well as other improvements (improved resistance to flammability, improved adhesion to metal substrates, for example) over those urethane systems currently available.

SUMMARY OF THE INVENTION

The present invention contemplates the provision of two-component urethane coating compositions comprising a first component comprising an organic polyfunctional isocyanate, and a second component comprising an acidic ester of a phosphoric acid, the organic portions of said acidic acid being selected from the group consisting of hydrocarbyloxy and hydroxy-substituted hydrocarbyloxy compounds, such compositions providing enhanced corrosion resistance properties as well as improved flame retardancy and metal adhesion characteristics over the two-component urethane systems of the prior art. An essential ingredient in the compositions of the invention is a non-Newtonian colloidal disperse system which can be provided with either the first component and/or the second component parts of the compositions of the invention. The non-Newtonian colloidal disperse systems provided in accordance with the present invention comprise (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions. The invention also relates to a method of coating a substrate comprising mixing the foregoing components and depositing the resulting composition on said substrate.

DETAILED DESCRIPTION OF THE PREFERRED EMBODIMENT

The Non-Newtonian Disperse Systems

The terminology "disperse system" as used in the specification and claims is a term of art generic to colloids or colloidal solutions, e.g., "any homogeneous medium containing dispersed entities of any size and state," Jirgensons and Straumanis, "A Short Textbook on Colloidal Chemistry" (2nd Ed.) The Macmillan Co., New York, 1962 at page 1. However, the particular disperse systems of the present invention form a subgenus within this broad class of disperse system, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in the range of 30 A. to 200 A. give excellent results. The minimum unit particle size is at least 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal containing particles." Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids, and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the solid metal-containing particles and the disperse medium, the colloidal disperse systems of the invention are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed hereinabove. Because of the molecular orientation in these micellar colloidal particles, such particles are characterized by a metal containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal petrosulfonate.

The second essential component of the colloidal disperse system is the dispersing medium. The identity of the medium is not a particularly critical aspect of the invention as the medium primarily serves as the liquid vehicle in which solid particles are dispersed. The medium can have components characterized by relatively low boiling points, e.g., in the range of 25° to 120° C. to facilitate subsequent removal of a portion or substantially all of the medium from the aqueous compositions of the invention or the components can have a higher boiling point to protect against removal from such compositions upon standing or heating. There is no criticality in an upper boiling point limitation on these liquids.

Representative liquids include mineral oils, the alkanes and haloalkanes of five to eighteen carbons, polyhalo- and perhaloalkanes of up to about six carbons, the cycloalkanes of five or more carbons, the corresponding alkyl-and/or halo-substituted cycloalkanes, the aryl hydrocarbons, the alkylaryl hydrocarbons, the haloaryl hydrocarbons, ethers such as dialkyl ethers, alkyl aryl ethers, cycloalkyl ethers, cycloalkylalkyl ethers, alkanols, alkylene glycols, polyalkylene glycols, alkyl ethers of alkylene glycols and polyalkylene glycols, dibasic alkanoic acid diesters, silicate esters, and mixtures of these. Specific examples include petroleum ether, Stoddard Solvent, pentane, hexane, octane, isooctane, undecane, tetradecane, cyclopentane, cyclohexane, isopropylcyclohexane, 1,4-dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-amylether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-difluoro-tetrachloroethane, dichlorofluoromethane, 1,2-dibromotetrafluoroethane, trichlorofluoromethane, 1-chloropentane, 1,3-dichlorohexane, formamide, dimethylformamide, acetamide, dimethylacetamide, diethylacetamide, propionamide, diisooctyl azelate, ethylene glycol, polypropylene glycols, hexa-2-ethylbutoxy disiloxane, etc.

Also useful as dispersing medium are the low molecular weight, liquid polymers, generally classified as oligomers, which include the dimers, tetramers, pentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention. Mineral oil can serve by itself as the disperse medium.

The most preferred disperse systems are those containing at least some mineral oil as a component of the disperse medium. These systems are particularly effective in the preparation of the urethane coating compositions of the invention. Any amount of mineral oil is beneficial in this respect. However, in this preferred class of systems, it is desirable that mineral oil comprise at least about 1% by weight of the total medium, and preferably at least about 5% by weight. Those mediums comprising at least 10% by weight mineral oil are especially useful. As will be seen hereinafter, mineral oil can serve as the exclusive disperse medium.

In addition to the solid, metal-containing particles and the disperse medium, the disperse systems employed herein require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

Preparation of the Non-Newtonian Disperse Systems

Broadly speaking, the colloidal disperse systems of the invention are prepared by treating a single phase homogeneous, Newtonian system of an "overbased," "superbased," or "hyperbased," organic compound with a conversion agent, usually an active hydrogen containing compound, the treating operation being simply a thorough mixing together of the two components, i.e., homogenization. This treatment converts these single phase systems into the non-Newtonian colloidal disperse systems utilized in the compositions of the present invention.

The terms "overbased," "superbased," and "hyperbased," are terms of art which are generic to well known classes of metal-containing materials. These overbased materials have also been referred to as "complexes," "metal complexes," "high-metal containing salts," and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

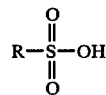

is neutralized with a basic metal compound, e.g., calcium hydroxide, the "normal" metal salt produced will contain one equivalent of calcium for each equivalent of acid, i.e.,

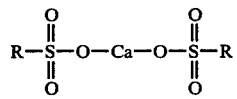

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt or a metal excess of 3.5 equivalents. The actual stoichiometric excess of metal can vary considerably, for example, from about 0.1 equivalent to about 30 or more equivalents depending on the reactions, the process conditions, and the like. These overbased materials useful in preparing the disperse systems will contain from about 3.5 to about 30 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, in the normal calcium sulfonate discussed above, the metal ratio is one, and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

The overbased materials are prepared by treating a reaction mixture comprising the organic material to be overbased, a reaction medium consisting essentially of at least one inert, organic solvent for said organic material, a stoichiometric excess of a metal base, and a promoter with an acidic material. The methods for preparing the overbased materials as well as an extremely diverse group of overbased materials are well known in the prior art and are disclosed for example in the following U.S. Pat. Nos.: 2,616,904; 2,616,905; 2,616,906; 2,616,911; 2,616,924; 2,616,925; 2,617,049; 2,695,910, 2,723,234; 2,723,235; 2,723,236; 2,760,970; 2,767,164; 2,767,209; 2,777,874; 2,798,852; 2,839,470; 2,856,359; 2,859,360; 2,856,361; 2,861,951; 2,883,340; 2,915,517; 2,959,551; 2,968,642; 2,971,014; 2,989,463; 3,001,981; 3,027,325; 3,070,581; 3,108,960; 3,147,232; 3,133,019; 3,146,201; 3,152,991; 3,155,616; 3,170,880; 3,170,881; 3,172,855; 3,194,823; 3,223,630; 3,232,883; 3,242,079; 3,242,080; 3,250,710; 3,256,186; 3,274,135; 3,492,231; and 4,230,586. These patents disclose processes, materials which can be overbased, suitable metal bases, promoters, and acidic materials, as well as a variety of specific overbased products useful in producing the disperse systems of this invention and are, accordingly, incorporated herein by reference.

An important characteristic of the organic materials which are overbased is their solubility in the particular reaction medium utilized in the overbasing process. As the reaction medium used previously has normally comprised petroleum fractions, particularly mineral oils, these organic materials have generally been oil-soluble. However, if another reaction medium is employed (e.g. aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patent and are, accordingly, incorporated herein by reference. U.S. Pat. No. 2,777,874 identified organic acids suitable for preparing overbased materials which can be converted to disperse systems for use in the resinous compositions of the invention. Similarly, U.S. Pat. Nos. 2,616,904; 2,695,910; 2,767,164; 2,767,209; 3,147,232; and 3,274,135 disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in U.S. Pat. Nos. 2,883,340; 2,915,517; 3,001,981; 3,108,960; and 3,232,883. Overbased phenates are disclosed in U.S. Pat. No. 2,959,551 while overbased ketones are found in U.S. Pat. No. 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in U.S. Pat. Nos. 2,968,642; 2,971,014; and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in U.S. Pat. No. 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The organic liquids used as the disperse medium in the colloidal disperse system can be used as solvents for the overbasing process.

The metal compounds used in preparing the overbased materials are normally the basic salts of metals in Group I-A and Group II-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. For purposes of this invention the preferred overbased materials are prepared from the alkaline earth metal oxides, hydroxides, and alcoholates such as the alkaline earth metal lower alkoxides. The most preferred disperse systems of the invention are made from overbased materials containing calcium and/or barium as the metal.

The promoters, that is, the materials which permit the incorporation of the excess metal into the overbased material, are also quite diverse and well known in the art as evidenced by the cited patents. A particularly comprehensive discussion of suitable promoters is found in U.S. Pat. Nos. 2,777,874; 2,695,910; and 2,616,904. These include the alcoholic and phenolic promoters which are preferred. The alcoholic promoters include the alkanols of one to about twelve carbon atoms such as methanol, ethanol, amyl alcohol, octanol, isopropanol, and mixtures of these and the like. Phenolic promoters include a variety of hydroxy-substituted benzenes and naphthalenes. A particularly useful class of phenols are the alkylated phenols of the type listed in U.S. Pat. No. 2,777,874, e.g., heptylphenols, octylphenols, and nonylphenols. Mixtures of various promoters are sometimes used.

Suitable acidic materials are also disclosed in the above cited patents, for example, U.S. Pat. No. 2,616,904. Included within the known group of useful acidic materials are liquid acids such as formic acid, acetic acid, nitric acid, sulfuric acid, hydrochloric acid, hydrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc. are ordinarily employed as the acidic materials. The most preferred acidic materials are carbon dioxide and acetic acid.

In preparing overbased materials, the material to be overbased, an inert, non-polar, organic solvent therefor, the metal base, the promoter and the acidic material are brought together and a chemical reaction ensues. The exact nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrosulfonate.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to incorporation with the compositions of the present invention to forming the disperse system or thereafter.

A preferred class of overbased materials used as starting materials in the preparation of the disperse systems of the present invention are the alkaline earth metal-overbased oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids suitable for preparing these overbased materials are discussed and identified in detail in the above-cited patents. Particularly U.S. Pat. Nos. 2,616,904 and 2,777,874 disclose a variety of very suitable organic acids. For reasons of economy and performance, overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetrapropylene-substituted glutaric acid, polyisobutene (M.W.-5000)-substituted succinic acid, polypropylene, (M.W.-10,000)-substituted succinic acid, octadecyl-substituted adipic acid, chlorostearic acid, 9-methylstearic acid, dichlorostearic acid, stearylbenzoic acid, eicosane-substituted naphthoic acid, dilauryl-decahydro-naphthalene carboxylic acid, didodecyl-tetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and tri-aliphatic hydrocarbon substituted aryl sulfonic acids and the petroleum sulfonic acids (petrosulfonic acids) are particularly preferred. Illustrative examples of suitable sulfonic acids include mahogany sulfonic acids, petrolatum sulfonic acids, monoeicosane-substituted naphthalene sulfonic acids dodecylbenzene sulfonic acids, didodecylbenzene sulfonic acids, dinonylbenzene sulfonic acids, cetyl-chlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetyl-cyclopentane sulfonic acid, lauryl-cyclohexanesulfonic acids, polyethylene (M.W.-750) sulfonic acids, etc. Obviously, it is necessary that the size and number of aliphatic groups on the aryl sulfonic acids be sufficient to render the acids soluble. Normally the aliphatic groups will be alkyl and/or alkenyl groups such that the total number of aliphatic carbons is at least twelve.

Within this preferred group of overbased carboxylic and sulfonic acids, the barium and calcium overbased mono-, di-, and tri-alkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isooctadecylbenzene sulfonic acid, stearylnaphthalene sulfonic acid, and the like. The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acid, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum maphthene sulfonic acid, etc. This especially preferred group of aliphatic fatty acids includes the saturated and unsaturated higher fatty acids containing from 12 to about 30 carbon atoms. Illustrative of these acids are lauric acid, palmitic acid, oleic acid, linoletic acid, linolenic acid, oleostearic acid, stearic acid, myristic acid, and undecalinic acid, alphachlorostearic acid, and alpha-nitrolauric acid.

As shown by the representative examples of the preferred classes of sulfonic and carboxylic acids, the acids may contain nonhydrocarbon substituents such as halo, nitro, alkoxy, hydroxyl, and the like.

It is desirable that the overbased materials used to prepare the disperse system have a metal ratio of at least about 3.5 and preferably about 4.5. An especially suitable group of the preferred sulfonic acid overbased materials has a metal ratio of at least about 7.0. While overbased materials having a metal ratio of 75 have been prepared, normally the maximum metal ratio will not exceed about 30 and, in most cases, not more than about 20.

The overbased materials used in preparing the disperse systems utilized in the compositions of the invention contain from about 10% to about 70% by weight of metal-containing components. As explained hereafter, the exact nature of these metal containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal containing components of the overbased material would be both the amorphous compounds and the acid salt. The remainder of the overbased materials consist essentially of the inert organic reaction medium and any promoter which is not removed from the overbased product. For purposes of this application, the organic material which is subjected to overbasing is considered a part of the metal-containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used herein is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of carbon dioxide, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, and carbon dioxide. Mixtures of two or more of these conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about twelve carbons are especially useful while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopentathol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about six carbon atoms and mono-lower alkyl ethers thereof such as monomethyl-ether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased material to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (M.W.-350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2-octadecyl-imidazoline, and oxazolidine. Boron acids are also useful conversion agents and include boronic acids (e.g., alkyl-$B(OH)_2$ or aryl-$B(OH_2)$, boric acid (i.e., $H_3BO_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with posphorus oxides and phosphorus sulfides are particularly useful, e.g., $P_3O_5$ and $P_2S_5$.

Carbon dioxide can be used as the conversion agent. However, it is preferable to use this conversion agent in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the ovrbased materials, there sometimes are present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood however, that the removal of these contaminants, while desirable for reasons just mentioned, is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse systems. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide gradually escapes from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. In fact, useful disperse systems for employment in the resinous ccompositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the aqueous compositions of the invention. In such cases, it is advantageous to permit the conversion agents to remain in the disperse system until it is mixed with such aqueous compositions. Thereafter, the conversion agents can be removed from such compositions by conventional devolatilization techniques if desired.

To better illustrate the colloidal disperse systems utilized in the invention, the procedure for preparing a preferred system is described below:

As stated above, the essential materials for preparing an overbased product are (1) the organic material to be overbased, (2) an inert, non-polar organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-phenatanol is heated to 35° C. and subjected to the following operating cycle four times: mixing with 143 grams of 90% calcium hydroxide and treating the mixture with carbon dioxide until it has a base number of 32–39. The resulting product is then heated to 155° C. during a period of 9 hours to remove the alcohols and then filtered at this temperature. The filtrate is a calcium overbased petrosulfonate having a metal ratio of 12.2

A mixture of 150 parts of the foregoing overbased material, 15 parts of methyl alcohol, 10.5 parts of n-pentanol and 45 parts of water is heated under reflux conditions at 71°–74° C. for 13 hours. The mixture becomes a gel. It is then heated to 144° over a period of 6 hours and diluted with 126 parts of mineral oil having a viscosity of 2000 SUS at 100° F. and the resulting mixture heated at 144° C. for an additional 4.5 hours with stirring. This thickened product is a colloidal disperse system of the type contemplated by the present invention.

The disperse systems are characterized by three essential components: (1) solid, metal-containing particles formed in situ, (2) an inert, non-polar, organic liquid which functions as the disperse medium, and (3) an organic compound which is soluble in the disperse medium and the molecules of which are characterized by a hydrophobic portion and at least one polar substituent. In the colloidal disperse system described immediately above, these components are as follows: (1) calcium carbonate in the form of solid particles, (2) mineral oil, and (3) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material.

It is also readily seen that the solid, metal-containing particles formed in situ possess the same chemical composition as would the reaction products of the metal base and the acidic material used in preparing the overbased materials. Thus, the actual chemical identity of the metal containing particles formed in situ depends upon both the particular metal base or bases employed and the particular acidic material or materials reacted therewith. For example, if the metal base used in preparing the overbased material were barium oxide and if the acidic material was a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased material prior to conversion are not characterized by the presence of these detectable particles.

X-ray diffraction and electron microscope studies have been made of both overbased organic materials and colloidal disperse systems prepared therefrom. These studies establish the presence in the disperse systems of the solid metal-containing salts. For example, in the disperse system prepared herein above, the calcium carbonate is present as solid calcium carbonate having a particle size of about 40 to 50 A. (unit particle size) and interplanar spacing (dA.) of 3.035. But X-ray diffraction studies of the overbased material from which it was prepared indicate the absence of calcium carbonate of this type. In fact, calcium carbonate present as such, if any, appears to be amorphous and in solution. While applicant does not intend to be bound by any theory offered to explain the changes which accompany the conversion step, it appears that conversion permits particle formation and growth. That is, the amorphous, metal-containing apparently dissolved salts or complexes present in the overbased material form solid, metal-containing particles which by a process of particle growth become colloidal particles. Thus, in the above example, the dissolved amorphous calcium carbonate salt or complex is transformed into solid particles which then "grow". In this example, they grow to a size of 40 to 50 A. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into various polymeric compositions thus facilitating the uniform distribution of the particles throughout the polymeric resin composition. This pre-wet, pre-dispersed character of the solid metal-containing particles resulting from their in situ formation is, thus, an important feature of the disperse systems.

In the foregoing example, the third component of the disperse system (i.e., the organic compound which is soluble in the disperse medium and which is characterized by molecules having a hydrophobic portion and a polar substituent) is calcium petrosulfonate,

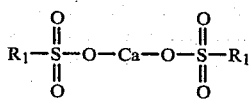

wherein $R_1$ is the residue of the petrosulfonic acid. In this case, the hydrophobic portion of the molecule is the hydrocarbon moiety of petrosulfonic, i.e., $-R_1$. The polar substituent is the metal salt moiety,

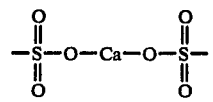

The hydrophobic portion of the organic compound is a hydrocarbon radical or a substantially hydrocarbon radical containing at least about twelve aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contain polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting materials (i.e., the material to be overbased and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

In the preparation of the individual component packages of the compositions of the invention it is essential to reduce the basicity of the non-Newtonian colloidal disperse system sufficiently to provide acceptable shelf life if the disperse system is to be provided with the isocyanate-containing component package. On the other hand, if the disperse system is provided with the acid ester containing component package, it is not necessary to reduce the basicity of the disperse system. If necessary, the basicity of the disperse system is preferably adjusted with a suitable acidic material (e.g., sulfonic acid, carbon dioxide, etc.). The amount of acidic material employed in the preparation of the disperse system will be that amount sufficient to reduce the neutralization base number of the final disperse system to about 3.0 or less. A more preferred disperse system will be that having a neutralization base number of about 1.0 or less and most preferred is a disperse system having a neutralization base number of zero.

Examples 1-84 illustrate various overbased materials and colloidal disperse systems prepared from these overbased materials. Unless otherwise indicated, "percentages" and "parts" refer to percent by weight and parts by weight. Where temperatures exceed the boiling points of the components of the reaction mixture, obviously reflux conditions are employed unless the reaction products are being heated to remove volatile components.

Examples 1 through 43 are directed to the preparation of Newtonian overbased materials illustrative of the types which can be used to prepare non-Newtonian colloidal disperse systems. The term "naphtha" as used in the following examples refers to petroleum distillates boiling in the range of about 90° C. to about 150° C. and usually designated Varnish Maker's and Painter's Naphtha.

EXAMPLE 1

To a mixture of 3,245 grams (12.5 equivalents) of a mineral oil solution of barium petroleum sulfonate (sulfate ash of 7.6%), 32.5 parts of octylphenol, 197 parts of water, there is added 73 parts of barium oxide within a period of 30 minutes at 57°-84° C. The mixture is heated at 100° C. for 1 hour to remove substantially all water and blown with 75 parts of carbon dioxide at 133° to 170° C. within a period of 3 hours. A mixture of 1,000 grams of the above carbonated intermediate product, 121.8 parts of octylphenol, and 234 parts of barium hydroxide is heated at 100° C. and then at 150° C. for 1 hour. The mixture is then blown with carbon dioxide at 150° C. for 1 hour at a rate of 3 cubic feet per hour. The carbonated product is filtered and the filtrate is found to have a sulfate ash content of 39.8% and a metal ratio of 9.3.

EXAMPLE 2

To a mixture of 3,245 grams (12.5 equivalents) of barium petroleum sulfonate, 1,460 grams (7.5 equivalents) of heptylphenol, and 2,100 grams of water in 8,045 grams of mineral oil there is added at 180° C. 7,400 grams (96.5 equivalents) of barium oxide. The addition of barium oxide causes the temperature to rise to 143° C. which temperature is maintained until all the water has been distilled. The mixture is then blown with carbon dioxide until it is substantially neutral. The product is diluted with 5,695 grams of mineral oil and filtered. The filtrate is found to have a barium sulfate ash content of 30.5% and a metal ratio of 8.1. Another inert liquid such as benzene, toluene, heptene, etc., can be substituted for all or part of the mineral oil.

EXAMPLE 3

A mixture of 1,285 grams (1.0 equivalent) of 40% barium petroleum sulfonate and 500 milliliters (12.5 equivalents) of methanol is stirred at 55°-60° C. while 301 grams (3.9 equivalents) of barium oxide is added portionwise over a period of 1 hour. The mixture is stirred an additional 2 hours at 45°-55° C., then treated with carbon dioxide at 55°-65° C. for 2 hours. The resulting mixture is freed of methanol by heating to 150° C. The residue is filtered through a siliceous filter aid, the clear, brown filtrate analyzing as: sulfate ash, 33.2%; slightly acid; metal ratio, 4.7.

EXAMPLE 4

A stirred mixture of 57 grams (0.4 equivalents) of nonyl alcohol and 3.01 grams (3.9 equivalents) of barium oxide is heated at 150°-175° C. for an hour, then cooled to 80° C. whereupon 400 grams (12.5 equivalents) of methanol is added. The resultant mixture is stirred at 70°-75° C. for 30 minutes, then treated with 1,285 grams (1.0 equivalent) of 40% barium petroleum sulfonate. This mixture is stirred at reflux temperature for an hour, then treated with carbon dioxide at 60°-70° C. for 2 hours. The mixture is then heated to 160° C. at a pressure of 18 millimeters of mercury and thereafter filtered. The filtrate is a clear, brown oily material having the following analysis: sulfate ash, 32.5%; neutralization number-nil; metal ratio, 4.7.

EXAMPLE 5

(a) To a mixture of 1,145 grams of a mineral oil solution of a 40% solution of barium mahogany sulfonates (1.0 equivalent) and 100 grams of methyl alcohol at 55° C., there is added 220 grams of barium oxide while the mixture is being blown with carbon dioxide at a rate of 2 to 3 cubic feet per hour. To this mixture there is added an additional 78 grams of methyl alcohol and then 460 grams of barium oxide while the mixture is blown with carbon dioxide. The carbonated product is heated to 150° C. for 1 hour and filtered. The filtrate is found to have a barium sulfate ash content of 53.8% and a metal ratio of 8.9.

(b) A carbonated basic metal salt is prepared in accordance with the procedure of (a) except that a total of 16 equivalents of barium oxide is used per equivalent of the barium mahogany sulfonate. The product possesses a metal ratio of 13.4.

EXAMPLE 6

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

A mixture of 1,305 grams of the above carbonated calcium sulfonate, 930 grams of mineral oil, 220 grams of methyl alcohol, 72 grams of isobutyl alcohol, and 38 grams of primary amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and filtered through a siliceous filter aid at this temperature. The filtrate has a calcium sulfate ash content of 39.5% and a metal ratio of 12.2.

EXAMPLE 7

A basic metal salt is prepared by the procedure described in Example 6 except that the slightly basic calcium sulfonate having a metal ratio of 2.5 is replaced with a mixture of that calcium sulfonate (280 parts by weight) and tall oil acid (970 parts by weight having an equivalent weight of 340) and that the total amount of calcium hydroxide used is 930 parts by weight. The resulting highly basic metal salt of the process has a calcium sulfate ash content of 48%, a metal ratio of 7.7, and an oil content of 31%.

EXAMPLE 8

A highly basic metal salt is prepared by the procedure of Example 7 except that the slightly basic calcium sulfonate starting material having a metal ratio of 2.5 is replaced with tall oil acids (1,250 parts by weight, having an equivalent weight of 340) and the total amount of calcium hydroxide used is 772 parts by weight. The resulting highly basic metal salt has a metal ratio of 5.2, a calcium sulfate ash content of 41%, and an oil content of 33%.

EXAMPLE 9

A normal calcium mahogany sulfonate is prepared by metathesis of a 60% oil solution of sodium mahogany sulfonate (750 parts by weight) with a solution of 67 parts of calcium chloride and 63 parts of water. The reaction mass is heated for 4 hours at 90° to 100° C. to effect the conversion of the sodium mahogany sulfonate to calcium mahogany sulfonate. Then 54 parts of lime is added and the whole is heated to 150° C. over a period of 5 hours. When the whole has cooled to 40° C., 98 parts of methanol is added and 152 parts of carbon dioxide is introduced over a period of 20 hours at 42°–43° C. Water and alcohol are then removed by heating the mass to 150° C. The residue in the reaction vessel is diluted with 100 parts of low viscosity mineral oil. The filtered oil solution of the desired carbonated calcium sulfonate overbased material shows the following analysis: sulfate ash content, 16.4%; neutralization number, 0.6 (acidic); and a metal ratio of 2.50. By adding barium or calcium oxide or hydroxide to this product with subsequent carbonation, the metal ratio can be increased to a ratio of 3.5 or greater as desired.

EXAMPLE 10

A mixture of 880 grams (0.968 moles) of a 57.5% oil solution of the calcium sulfonate of tridecylbenzene bottoms (the bottoms constitute a mixture of mono-, di-, and tri-decylbenzene), 149 grams of methanol, and 59 grams (1.58 equivalents) of calcium hydroxide are introduced into a reaction vessel and stirred vigorously. The whole is heated to 40°–45° C. and carbon dioxide is introduced for 0.5 hours at the rate of 2 cubic feet per hour. The carbonated reaction mixture is then heated to 150° C. to remove alcohol and any water present, and the residue is filtered for purpose of purification. The product, a 61% oil solution of the desired overbased carbonated calcium sulfonate material shows the following analysis: ash content, 16.8%; neutralization number, 7.0 (acidic); and metal ratio 2.42. By further carbonation in the presence of an alkali or alkaline earth metal oxide, hydroxide, or alkoxide, the metal ratio can readily be increased to 3.5 or greater.

EXAMPLE 11

A mixture of 2,090 grams (2.0 equivalents) of a 45% oil solution of calcium mahogany sulfonate containing 1% of water, 74 grams (2.0 equivalents) of calcium hydroxide, and 251 grams of ethylene glycol is heated for 1 hour at 100° C. Carbon dioxide is then bubbled through the mixture at 40°–45° C. for 5.5 hours. The ethylene glycol and any water present are removed by heating the mixture to a temperature of 185° C. at 10.2 millimeters of mercury. The residue is filtered yielding the desired overbased calcium sulfonate material, having the following analysis: sulfate ash, 12.9%, neutralization number 5.0 (acidic); and a metal ratio of 2.0 which can be increased to 3.5 or greater as desired by carbonation in the presence of calcium oxide or hydroxide.

EXAMPLE 12

A mixture comprising 1,595 parts of the overbased material of Example 9 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol, and 56 parts of mixed isomeric primaryamyl alcohols (containing about 65% normal amyl, 3% isoamyl and 32% of 2-methyl-1-butyl alcohols) is stirred vigorously at 40° C. and 25 parts of carbon dioxide is introduced over a period of 2 hours at 40°–50° C. Thereafter, three additional portions of calcium hydroxide, each amounting to 1.57 parts, are added and each such addition is followed by the introduction of carbon dioxide as previously illustrated. After the fourth calcium hydroxide addition and the carbonation step is completed, the reaction mass is carbonated for an additional hour at 43°–47° C. to reduce neutralization number of the mass to 4.0 (basic). The substantialy neutral, carbonated reaction mixture is freed from alcohol and any water of reaction by heating to 150° C. and simultaneously blowing it with nitrogen. The residue in the reaction vessel is filtered. The filtrate, and oil solution of the desired substantially neutral, carbonated calcium sulfonate overbased material of high metal ratio, shows the following analysis: sulfate ash content, 41.11%; neutralization number 0.9 (basic); and a metal ratio of 12.55.

The calcium phenate used above is prepared by adding 2,250 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of 1 hour. The whole is heated to 80° C. and 200 additional parts of calcium hydroxide (making a total of 207 parts or 5 moles) is added over a period of 1 hour at 80°-90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptylphenol-formaldehyde condensation product is found to contain 7.56% sulfate ash.

EXAMPLE 13

A mixture of 574 grams (0.5 equivalents) of 40% barium petroleum sulfonate, 98 grams (1.0 equivalents) of furfuryl alcohol, and 762 grams of mineral oil is heated with stirring at 100° C. for an hour, then treated portionwise over a 15-minute period with 230 grams (3.0 equivalents) of barium oxide. During this latter period, the temperature rises to 120° C. (because of the exothermic nature of the reaction of barium oxide and the alcohol). The mixture then is heated to 150°-160° C. for an hour, and treated subsequently at this temperature for 1.5 hours with carbon dioxide. The material is concentrated by heating to a temperature of 150° C. at a pressure of 10 millimeters of mercury and thereafter filtered to yield a clear, oil-soluble filtrate having the following analysis: sulfate ash content, 21.4%; neutralization number, 2.6 (basic); and a metal ratio of 6.1.

EXAMPLE 14

An overbased material is prepared by the procedure of Example 6 except that the slightly basic calcium sulfonate starting material has a metal ratio of 1.6 and the amount of this calcium sulfonate used is 10.50 parts (by weight) and that the total amount of lime used is 630 parts. The resulting metal salt has a calcium sulfate ash content of 40%, a ratio of the inorganic metal group to the bivalent bridging group of 16, and an oil content of 35%.

EXAMPLE 15

To a mixture of 1614 parts (3 equivalents) of a polyisobutenyl succinic anhydride (prepared by the reaction of a chlorinated polyisobutene having an average chlorine content of 4.3% and an average of 67 carbon atoms with maleic anhydride at about 200° C.), 4313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hours while heating to 105° C. Isooctanol (75 parts) is added while the mixture is heated to 150° C. over a 1.5-hour period. The mixture is maintained at 150°-170° C. and blown with carbon dioxide at a rate of 4 cubic feet per hour for 3.5 hours. The reaction mixture is filtered through a filter aid and the filtrate is the desired product having a sulfate ash content of 18.9% and a metal ratio of 8.0.

EXAMPLE 16

The procedure of Example 6 is repeated except that an equivalent amount of sodium hydroxide is used in lieu of the calcium oxide. The product is the corresponding sodium overbased material.

EXAMPLE 17

A mixture of 244 parts (0.87 equivalent) of oleic acid, 180 parts of primary isooctanol, and 400 parts of mineral oil is heated to 70° C. whereupon 172.6 parts (2.7 equivalents) of cadmium oxide is added. The mixture is heated for 3 hours at a temperature of 150° to 160° C. while removing water. Barium hydroxide monohydrate (324 parts, 3.39 equivalents) is then added to the mixture over a period of 1 hour while continuing to remove water by means of a side-arm water trap. Carbon dioxide is blown through the mixture at a temperature of from 150°-160° C. until the mixture is slightly acidic to phenolphthalein. Upon completion of the carbonation, the mixture is stripped to a temperature of 150° C. at 35 mm. of mercury to remove substantialy all the remaining water and alcohol. The residue is the desired overbased product containing both barium and cadmium metal.

EXAMPLE 18

The procedure of Example 13 is repeated except that the barium sulfonate is replaced by an equivalent amount of potassium sulfonate, and potasium oxide is used in lieu of the barium oxide resulting in the preparation of the corresponding potassium overbased material.

EXAMPLE 19

A sulfoxide is prepared by treating polyisobutylene (average molecular weight 750) with 47.5% of its weight of $SOCl_2$ for 4.5 hours at 220° C. A mixture of 787 grams (1.0 equivalent) of this sulfoxide, 124 grams (0.6 equivalent) of diisobutylphenol, 550 grams of mineral oil, and 200 grams of water was warmed to 70° C. and treated with 360 grams (4.0 equivalents) of barium oxide. This mixtre is heated at reflux temperature for 1 hour and treated at 150° C. with carbon dioxide until the mixture is substantially neutral and thereafter filtered to yield a clear, oil-soluble liquid having the following analysis: sulfate ash, 22.8%; neutralization number, 5.8 (basic); and metal ratio, 5.8.

EXAMPLE 20

To a mixture of 268 grams (1.0 equivalent) of oleyl alcohol, 675 grams of mineral oil, 124 grams (0.6 equivalent) of diisobutylphenol, and 146 grams of water, at 70° C. there is added 308 grams (4.0 equivalents) of barium oxide. This mixture is heated at reflux temperature for 1 hour, then at 150° C. while bubbling carbon dioxide therethrough until substantial neutrality of the mixture is achieved. The resulcing reaction mass is filtered resulting in a clear, brown, oil-soluble filtrate having the following analysis: sulfate ash content, 29.8%; neutralization number 2.6 (basic); and metal ratio, 6.0.

EXAMPLE 21

To a mixture of 423 grams (1.0 equivalent) of sperm oil, 124 grams (0.6 equivalent) of heptylphenol, 500 grams of mineral oil, and 150 grams of water there are added at 70° C. 308 grams (4.0 equivalents) of barium oxide. This mixture is heated at reflux temperature for 1 hour, dried by heating at about 150° C. and thereafter carbonated by treatment with carbon dioxide at the same temperature until the reaction mass was slightly acidic. Filtration yields a clear, light brown, non-viscous overbased liquid material having the following analysis: sulfate ash content, 32.0%; neutralization number 0.5 (basic); metal ratio, 6.5.

EXAMPLE 22

To a mixture of 174 grams (1.0 equivalent) of N-octadecyl propylene diamine, 124 grams (0.6 equivalent) of diisobutylphenol, 766 grams of mineral oil, 146 grams of water, there are added 306 grams (4.0 equivalents) of barium oxide and the whole is refluxed for an hour. Water is subsequently removed by raising the temperature to 150° C. and thereafter carbon dioxide is bubbled therethrough while maintaining this temperature. When the reaction mass is substantially neutral, carbon dioxide addition is ceased and the reaction mass filtered producing a clear, oil-soluble liquid having the following analysis: sulfate ash content, 28.9%; neutralization number, 2.5 (basic); metal ratio, 5.8.

EXAMPLE 23

A mixture of 6000 grams of a 30% solution of barium petroleum sulfonate (sulfate ash 7.6%), 348 grams of paratertiary butylphenol, and 2911 grams of water are heated to a temperature 60° C. while slowly adding 1100 grams of barium oxide and raising the temperature to 94°-98° C. The temperature is held within this range for about 1 hour and then slowly raised over a period of 7.5 hours to 150° C. and held at this level for an additional hour assuring substantial removal of all water. The resulting overbased material is a brown liquid having the following analysis: sulfate ash content, 26.0%; metal ratio, 4.35.

This product is then treated with $SO_2$ until 327 grams of the mass combined with the overbased material. The product thus obtained has a neutralization number of zero. The $SO_2$-treated material is liquid and brown in color.

One thousand grams of the $SO_2$-treated overbased material produced according to the preceding paragraph is mixed with 286 grams of water and heated to a temperature of about 60° C. Subsequently, 107.5 grams of barium oxide are added slowly and the temperature is maintained at 94°-98° C. for 1 hour. Then the total reaction mass is heated to 150° C. over a 1 1/16 hour period and held there for a period of 1 hour. The resulting overbased material is purified by filtration, the filtrate being the brown, liquid overbased material having the following analysis: sulfate ash content, 33.7%; basic number, 38.6; metal ratio, 6.3.

EXAMPLE 24

(a) A polyisobutylene having a molecular weight of 700-800 is prepared by the aluminum chloride-catalyzed polymerization of isobutylene at 0°-30° C., is nitrated with a 10% excess (1.1 moles) of 70% aqueous nitric acid at 70°-75° C. for 4 hours. The volatile components of the product mixture are removed by heating to 75° C. at a pressure of 75 mm. of mercury. To a mixture of 151 grams (0.19 equivalent) of this nitrated polyisobutylene, 113 grams (0.6 equivalent) of heptylphenol, 155 grams of water, and 2,057 grams of mineral oil there is added at 70° C. 612 grams (8 equivalents) of barium oxide. This mixture is heated at 150° C. for an hour, then treated with carbon dioxide at this same temperature until the mixture is neutral (phenolphthalein indicator; ASTM D-974-53% procedure at 25° C.; a measurement of the degree of conversion of the metal reactant, i.e., barium oxide, bicarbonation). The product mixture is filtered and filtrate found to have the following analysis: sulfate ash content, 27.6%; percent N, 0.06; and metal ratio, 9.

(b) A mixture of 611 grams (0.75 mole) of the nitrated polyisobutylene of Example 1, 96 grams (0.045 mole) of heptylphenol, 2104 grams of mineral oil, 188 grams of water and 736 grams (4.8 moles) of barium oxide was heated at reflux temperature for an hour. The water was vaporized and carbon dioxide passed into the mixture at 150° C. until the mixture was no longer basic. This carbonated mixture was filtered and the clear fluid filtrate showed the following analysis: sulfate ash content, 26.3%; percent N, 0.15; base No. 2.4; metal ratio 6.7.

EXAMPLE 25

(a) A mixture of 1 equivalent of a nitrated polypropylene having a molecular weight of about 3000, 2 equivalents of cetylphenol, mineral oil, and 3 equivalents of barium hydroxide is heated at reflux temperature for 1 hour. The temperature is then raised to 150° C. and carbon dioxide is bubbled through the mixture at this temperature. The reaction product is filtered and the filtrate is the desired overbased material.

(b) A solvent-refined, acid-treated Pennsylvania petroleum lubricating oil is nitrated by treatment with 1.5 moles of 70% aqueous nitric acid at 54°-78° C. for 8 hours. After removal of volatile components of the product mixture by heating at 103° C. at a pressure of 15 mm. of mercury for 2 hours, a 787 grams portion (1.0 equivalent) of the nitrated product is treated with 2 grams (0.3 equivalent) of heptylphenol, 495 grams of mineral oil, 90 grams of water, and 378 grams (5 equivalents) of barium oxide. This mixture is heated at reflux temperature for an hour, then freed of water by distillation. The temperature is increased to 150° C. whereupon carbon dioxide is bubbled into the mixture until it is neutral. Filtration yields a clear filtrate with the following analysis: percent sulfate ash, 27.6; percent N, 0.5; and metal ratio, 3.1.

EXAMPLE 26

(a) A mixture of 1000 parts of mineral oil, 2 equivalents of barium hydroxide, 1 equivalent of 1-nitro-3-octadecyl-cyclohexane and 1 equivalent (i.e., 0.5 mole) of 4,4'-methylene-bis(heptylphenol) is carbonated at 100°-150° C. for 4 hours until the reaction mixture is substantially neutral to phenolphthalein indicator. The reaction mass is filtered and the desired product is the filtrate.

(b) A mixture of 1000 parts of mineral oil, 3 equivalents of lithium hydroxide, 1 equivalent of nitrated polyisobutene (prepared by mixing 500 parts by weight of polyisobutene having an average molecular weight of 1000 and 62.5 parts of 67% aqueous nitric acid at 65°-70° C. for 11 hours) and para-butylphenol (1 equivalent) is carbonated according to the technique of (a) above to produce the corresponding lithium overbased material.

EXAMPLE 27

A copolymer of isobutene and piperylene (weight ratio of 98.2) having a molecular weight of about 2000, is nitrated by the procedure used in the preceding example for the nitration of polyisobutene. An overbased product is then prepared from this nitrated reactant by mixing 1 equivalent thereof with 1 equivalent of alpha-butyl-beta-naphthol and 7 equivalents barium hydroxide, diluting the mixture with mineral oil to a 50% oil mixture, and then carbonating the mixture at 120°–160° C. until it is substantially neutral to phenolphthalein indicator. The reaction product is filtered and the filtrate is the desired overbased product.

EXAMPLE 28

A mixture of 630 grams (2 equivalents) of a rosin amine (consisting essentially of dehydroabietyl amine) having a nitrogen content of 44% and 245 grams (1.2 equivalents) of heptylphenol having a hydroxyl content of 8.3% is heated to 90° C. and thereafter mixed with 230 grams (3 equivalents) of barium oxide at 90°–140° C. The mixture is purged with nitrogen at 140° C. A 600 gram portion is diluted with 400 grams of mineral oil and filtered. The filtrate is blown with carbon dioxide, diluted with benzene, heated to remove the benzene, mixed with xylene, and filtered. The filtrate, a 20% xylene solution of the product has a barium sulfate ash content of 25.1%, a nitrogen content of 2%, and a reflux base number of 119. (The basicity of the metal composition is expressed in terms of milligrams of KOH which are equivalent to one gram of the composition.) For convenience, the basicity thus determined is referred to in the specification as a "reflux base number."

EXAMPLE 29

An amine-aldehyde condensation product is obtained as follows formaldehyde (420 grams, 14 moles) is added in small increments to a mixture comprising N-octadecylpropylenediamine (1,392 grams, 4 moles), mineral oil (300 grams), water (200 grams), and calcium hydroxide (42 grams condensation catalyst) at the reflux temperature, i.e., 100°–105° C. The rate of addition of formaldehyde is such as to avoid excessive foaming. The mixture is heated at reflux temperature for 1 hour, slowly heated to 155° C., and blown with nitrogen at 150°–155° C. for 2 hours to remove all volatile components. It is then filtered. The filtrate, 93% of the theoretical yield, is a 65.4% oil solution of the amine-aldehyde condensation product having a nitrogen content of 2.4%.

A 1,850 gram portion (3.2 equivalents of nitrogen) is mixed with 1,850 grams of heptylphenol (0.97 equivalent), 1,485 grams of mineral oil, and 1,060 grams of 90% pure barium oxide (12.6 equivalents) and heated to 70° C. Over a period of 1 hour, 500 grams of water is added while maintaining the temperature in the range of 70°–100° C. The mixture is heated at 110° to 115° C. for 4.7 hours and thereafter to 150° C. While maintaining the temperature within the range of 140°–150° C., the reaction mixture is carbonated and subsequently filtered. The filtrate is a 57.8% oil solution of the overbased amine-aldehyde condensation product having a nitrogen content of 0.87% and a barium sulfate ash content of 29.5%.

EXAMPLE 30

A partially acylated polyamine reactant is prepared as follows: a mixture (565 parts by weight) of an alkylene amine mixture consisting of triethylene tetramine and diethylene triamine in weight ratio of 3:1 is added at 20°–80° C. to a mixture of naphthenic acid having an acid number of 180 (1,270 parts) and oleic acid (1,110 parts). The total quantity of the two acids used is such as to provide 1 equivalent of acid for each two equivalents of the amine mixture used. The reaction is exothermic. The mixture is blown with nitrogen while it is being heated to 240° C. in 4.5 hours and thereafter heated at this temperature for 2 hours. Water is collected as the distillate.

To the above residue, ethylene oxide (140 parts) is added at 170°–180° C. within a period of 2 hours while nitrogen is bubbled through the reaction mixture. Nitrogen blowing is continued for an additional 15 minutes and the reaction mixture then diluted with 940 parts of xylene to a solution containing 25% by weight of xylene. The resulting solution has a nitrogen content of 5.4% and a base number of 82 at pH of 4, the latter being indicative of free amino groups.

A 789 gram portion of the above xylene solution (3 equivalents of nitrogen) is heated to 150° C. at a pressure of 2 millimeters of mercury to distill off xylene and is then mixed with 367 grams of heptylphenol (having a hydroxyl content of 8.3%; 1.8 equivalents). To this mixture there is added 345 grams (4.5 equivalents) of barium oxide in small increments at 90°–111° C. The mixture is heated at 90°–120° C. for 2.5 hours and blown with carbon dioxide for 1.75 hours. It is diluted with 130 grams of xylene and then heated at 150° C. for 3.5 hours. It is then diluted with 20% by weight of xylene and filtered. The filtrate has a barium sulfate ash content of 33.2%, a nitrogen content of 3.52% and a reflux base number of 134.

EXAMPLE 31

To a mixture of 408 grams (2 equivalents) of heptylphenol having a hydroxy content of 8.3% and 264 grams of xylene there is added 383 grams (5 equivalents) of barium oxide in small increments at 85°–110° C. Thereafter. 6 grams of water is added and the mixture is carbonated at 100°–130° C. and filtered. The filtrate is heated to 100° C. diluted with xylene to a 25% xylene solution. This solution has a barium sulfate ash content of 41% and a reflux base number of 137.

EXAMPLE 32

A mixture of 5,846 parts (4.0 equivalents) of a neutral calcium sulfonate having a calcium sulfate ash content of 4.68% (66% mineral oil), 464 parts (2.4 equivalents) of heptylphenol, and 3.4 parts of water is heated to 80° C. whereupon 1,480 parts (19.2 equivalents) of barium oxide is added over a period of 0.6 hours. The reaction is exothermic and the temperature of the reaction mixture reaches 100° C. The mixture is heated to 150° C. and carbonated at this temperature. During the carbonation, 24 parts of barium chloride were added to the mixture. Oil was removed from the reaction mixture during the carbonation procedure. Carbonation is continued at this temperature until the mixture has a base number (phenolphthalein) of 80. Octyl alcohol (164 parts) and a filter aid are added to the mixture and the mixture if filtered while hot. The filtrate is the desired overbased barium bright stock sulfonate having a barium sulfate ash content of 26.42, a metal ratio of 4.6 and a reflux base number of 104.

EXAMPLE 33

Following the procedure for preparing barium and calcium overbased sulfonates exemplified above, sodium mahogany sulfonate (0.26 equivalent), 1 equivalent of phenol, and 5.3 equivalents of strontium oxide are carbonated until the reaction mixture is almost neutral. The resulting overbased material is filtered, the filtrate being the desired product and having a metal ratio of 4.6.

EXAMPLE 34

A barium overbased carboxylic acid is prepared by carbonating a mixture of 9.8 equivalents of barium hydroxide, 1 equivalent of heptylphenol, and 0.81 equivalent of a polyisobutene substituted succinic anhydride wherein the polyisobutenyl portion thereof has an average molecular weight of 1,000.

EXAMPLE 35

A mixture of 1,000 parts by weight of a polyisobutene having a molecular weight of 1,000 and 90 parts of phosphorus pentasulfide is prepared at room temperature, heated to 260° C. over 5 hours, and maintained at this temperature for an additional 5 hours. The reaction mass is then cooled to 106° C. and hydrolyzed by treatment with steam at this temperature for 5 hours. The hydrolyzed acid has a phosphorus content of 2.4%, a sulfur content of 2.8%. In a separate vessel, a mixture of oil and barium hydroxide is prepared by mixing 2,200 parts of a mineral oil and 1,150 parts of barium oxide at 88° C. and blowing the mixture with steam for 3 hours at 150° C. To this mixture there is added portionwise throughout a period of 3 hours, 1,060 parts of the above hydrolyzed acid while maintaining the temperature at 145°–150° C., and then 360 parts of heptylphenol is added over a 1.5 hour period. The resulting mixture is blown with carbon dioxide at the rate of 100 parts per hour for 3 hours at 150°–157° C. The carbonated product is mixed with 850 parts of a mineral oil and dried by blowing it with nitrogen at a temperature of 150° C. The dry product is filtered and the filtrate is diluted with mineral oil to a solution having a barium sulfate ash content of 25%. The final solution has a phosphorus content of 0.48%, a neutralization number less than 5 (basic), a reflux base number of 109, and a metal ratio of 7.2.

EXAMPLE 36

(a) To a mixture of 268 grams (1.0 equivalent) of oleyl alcohol, 124 grams (0.6 equivalent) of heptylphenol, 988 grams of mineral oil, and 160 grams of water there is added 168 grams (4.0 equivalents) of lithium hydroxide monohydrate. The mixture is heated at reflux temperature for an hour and then carbonated at 150° C. until it is substantially neutral. The filtration of this carbonated mixture yields a liquid having a lithium sulfate content of 12.7%.

(b) To a mixture of 1,614 parts (3 equivalents) of a polyisobutenyl succinic anhydride prepared by the reaction of a chlorinated polyisobutene having an average chlorine content of 4.3% and an average of 67 carbon atoms with maleic anhydride at about 200° C., 4,313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. in about 1.5 hours. The mixture is maintained at 150°–170° C. and blown with carbon dioxide at the rate of 4 cubic feet per hour for 3.5 hours. The reaction mixture is filtered through a filter aid and the filtrate is the desired product having a sulfate ash content of 18.9 and a metal ratio of 8.

EXAMPLE 37

A thiophosphorus acid is prepared as set forth in Example 35 above. A mixture of 890 grams of this acid (0.89 equivalent), 2,945 grams of mineral oil, 445 grams of heptylphenol (2.32 equivalents), and 874 grams of lithium hydroxide monohydrate (20.8 equivalents) formed by adding the metal base to the mineral oil solution of the acid and the heptylphenol over a 1.5 hour period maintaining the temperature at 100°–110° C. and thereafter drying at 150° C. for 2 hours, carbon dioxide is bubbled therethrough at the rate of 4 cubic feet per hour until the reaction mixture was slightly acidic to phenolphthalein, about 3.5 hours, while maintaining the temperature within the range of 150°–160° C. The temperature mixture is then filtered twice through a diatomaceous earth filter. The filtrate is the desired lithium overbased thio-phosphorus acid material having a metal ratio of 6.3.

EXAMPLE 38

(a) A reaction mixture comprising 2,442 grams (2.8 equivalents) of strontium petrosulfonate, 3,117 grams of mineral oil, 150 grams of isooctanol, and 910 grams of methanol is heated to 55° C. and thereafter 615 grams of strontium oxide (11.95 equivalents) is added over a 10 minute period while maintaining the reaction at a temperature of 55°–65° C. The mixture is heated an additional hour at this same temperature range and thereafter blown with carbon dioxide at a rate of 4 cubic feet per hour for about 3 hours until the reaction mixture was slightly acidic to phenolphthalein. Thereafter, the reaction mixture is heated to 160° C. and held there for about 1 hour while blowing the nitrogen at 5 cubic feet per hour. Thereafter, the product is filtered, the filtrate being the desired overbased material having a metal ratio of 3.8.

(b) To a mixture of 3,800 parts (4 equivalents) of a 50% mineral oil solution of lithium petroleum sulfonate (sulfate ash of 6.27%), 460 parts (2.4 equivalents) of heptylphenol, 1,920 parts of mineral oil, and 300 parts of water, there is added at 70° C. 1,216 parts (28.9 equivalents) of lithium hydroxide monohydrate over a period of 0.25 hour. This mixture is stirred at 110° C. for 1 hour, heated to 150° C. over a 2.5 hour period, and blown with carbon dioxide at the rate of 4 cubic feet per hour over a period of about 3.5 hours until the reaction mixture is substantially neutral. The mixture is filtered and the filtrate is the desired product having a sulfate ash content of 25.23% and a metal ratio of 7.2.

EXAMPLE 39

A mixture of alkylated benzene sulfonic acids and naphtha is prepared by adding 1,000 grams of a mineral oil solution of the acid containing 18% by weight mineral oil (1.44 equivalents of acid) and 222 grams of naphtha. While stirring the mixture, 3 grams of calcium chloride dissolved in 90 grams of water and 53 grams of Mississippi lime (calcium hydroxide) is added. This mixture is heated to 97°–99° C. and held at this temperature for 0.5 hour. Then 80 grams of Mississippi lime are added to the reaction mixture with stirring and nitrogen gas is bubbled therethrough to remove water, while heating to 150° C. over a 3 hour period. The reaction mixture is then cooled to 50° C. and 170 grams of methanol are added. The resulting mixture is blown with carbon dioxide at the rate of 2 cubic feet per hour until substantially neutral. The carbon dioxide blowing is discontinued and the water and methanol stripped from the reaction mixture by heating and bubbling nitrogen gas therethrough. While heating to remove the water and methanol, the temperature rose to 146° C. over a 1.75 hour period. At this point the metal ratio of the overbased material was 2.5 and the product is a clear, dark brown viscous liquid. This material is permitted to cool to 50° C. and thereafter 1,256 grams thereof is mixed with 574 grams of naphtha, 222 grams of methanol, 496 grams of Mississippi lime, and 111 grams of an equal molar mixture of isobutanol and amyl alcohol. The mixture is thoroughly stirred and carbon dioxide is blown therethrough at the rate of 2 cubic feet per hour for 0.5 hour. An additional 124 grams of Mississippi lime is added to the mixture with stirring and the $CO_2$ blowing continued. Two additional 124 grain increments of Mississippi lime are added to the reaction mixture while continuing the carbonation. Upon the addition of the last increment, carbon dioxide is bubbled through the mixture for an additional hour. Thereafter, the reaction mixture is gradually heated to about 146° C. over a 3.25 hour period while blowing with nitrogen to remove water and methanol from the mixture. Thereafter, the mixture is permitted to cool to room temperature and filtered producing 1,895 grams of the desired overbased material having a metal ratio of 11.3. The material contains 6.8% mineral oil, 4.18% of the isobutanol-amyl alcohol and 30.1% naphtha.

EXAMPLE 39A 1274 grams of methanol, 11.3 grams of calcium chloride and 90.6 grams of tap water are added to a resin reactor equipped with a heating mantle, thermocouple, gas inlet tube, condenser and metal stirrer. The mix is heated to 48° C. with stirring. 257.8 grams of Silo lime (calcium hydroxide) are added to provide a slurry. 2830 grams of alkylated benzene sulfonic acid is added to the mix over a period of one hour. The temperature of the mix rises to 53° C. 2510 grams of SC Solvent 100 (a high-boiling alkylated aromatic solvent supplied by Ohio Solvents) are added to the mix. The mix is stirred for one-half hour. Three increments of 709.1 grams each of Silo lime are added to the mix and carbon dioxide at a rate of 5 cubic feet per hour is bubbled through the mix after each increment. Total blowing with carbon dioxide is approximately seven hours with the temperature of the mix varying from 40° to 55° C. The reactor is equipped with a trap. Methanol and water are stripped from the mix by bubbling nitrogen at a rate of two cubic feet per hour through the mix over a twelve-hour period while maintaining the temperature of the mix at 155° C. The mix is held at a temperature of 155° C. for 15 minutes, and then cooled to room temperature. The mix is filtered through a Gyro Tester clarifier. The solids content is adjusted to 70% solids with SC Solvent 100.

EXAMPLE 40

A mixture of 406 grams of naphtha and 214 grams of amyl alcohol is placed in a three-liter flask equipped with reflux condenser, gas inlet tubes, and stirrer. The mixture is stirred rapidly while heating to 38° C. and adding 27 grams of barium oxide. Then 27 grams of water are added slowly and the temperature rises to 45° C. Stirring is maintained while slowly adding over 0.25 hours 73 grams of oleic acid. The mixture is heated to 95° C. with continued mixing. Heating is discontinued and 523 grams of barium oxide are slowly added to the mixture. The temperature rises to about 115° C. and the mixture is permitted to cool to 90° C. whereupon 67 grams of water are slowly added to the mixture and the temperature rises to 107° C. The mixture is then heated within the range of 107°–120° C. to remove water over a 3.3 hour period while bubbling nitrogen through the mass. Subsequently, 427 grams of oleic acid is added over a 1.3 hour period while maintaining a temperature of 120°–125° C. Thereafter heating is terminated and 236 grams of naphtha is added. Carbonation is commenced by bubbling carbon dioxide through the mass at two cubic feet per hour for 1.5 hours during which the temperature is held at 108°–117° C. The mixture is heated under a nitrogen purge to remove water. The reaction mixture is filtered twice producing a filtrate analyzing as follows: sulfate ash content, 34.42%; metal ratio, 313. The filtrate contains 10.7% amyl alcohol and 32% naphtha.

EXAMPLE 41

A reaction mixture comprising 1,800 grams of a calcium overbased petrosulfonic acid containing 21.7% by weight mineral oil, 36.14% by weight naphtha, 426 grams naphtha, 255 grams of methanol, and 127 grams of an equal molar amount of isobutanol and amyl alcohol are heated to 45° C. under reflux conditions and 148 grams of Mississippi lime (commercial calcium hydroxide) is added thereto. The reaction mass is then blown with carbon dioxide at the rate of 2 cubic feet per hour and thereafter 148 grams of additional Mississippi lime added. Carbonation is continued for another hour at the same rate. Two additional 147 gram increments of Mississippi lime are added to the reaction mixture, each increment followed by about a 1 hour carbonation process. Thereafter, the reaction mass is heated to a temperature of 138° C. while bubbling nitrogen therethrough to remove water and methanol. After filtration, 2,220 grams of a solution of the barium overbased petrosulfonic acid is obtained having a metal ratio of 12.2 and containing 12.5% by weight mineral oil, 34.15% by weight naphtha, and 4.03% by weight of the isobutanol amyl alcohol mixture.

EXAMPLE 42

(a) Following the procedure of Example 2 above, the corresponding lead product is prepared by replacing the barium petrosulfonate with lead petroleum sulfonate (1 equivalent) and barium oxide with lead oxide (25 equivalents).

(b) Following the procedure of Example 5(a) above, the corresponding overbased sodium sulfonate is prepared by replacing the barium oxide with sodium hydroxide.

EXAMPLE 43

A mixture of 1000 parts of a 60% mineral oil solution of sodium petroleum sulfonate (having a sulfated ash content of about 8.5%) and a solution of 71.3 parts of 96% calcium chloride in 84 parts of water is mixed at 100° C. for 0.25 hour. Then 67 parts of hydrated lime is added and the whole is heated at 100° C. for 0.25 hour then dried by heating to 145° C. to remove water. The residue is cooled and adjusted to 0.7% water content. One-hundred thirty parts methanol is added and the whole is blown with carbon dioxide at 45°–50° C. until it is substantially neutral. Water and alcohol are removed by heating the mass to 150° C. and the resulting oil solution is filtered. The resulting product is carbonated calcium sulfonate overbased material containing 4.78% calcium and a metal ratio of 2.5.

A mixture of 1000 parts of the above carbonated calcium sulfonate overbased material, 316 parts of mineral oil, 176 parts of methanol, 58 parts of isobutyl alcohol, 30 parts of primary amyl alcohol and 52.6 parts of the calcium phenate of Example 12 is prepared, heated to 35° C., and subjected to the following operating cycle four times: mixing with 93.6 parts of 97.3% calcium hydroxide and treating the mixture with carbon dioxide until it has a base number of 35–45. The resulting product is heated to 150° C. and simultaneously blown with nitrogen to remove alcohol and water, and then filtered. The filtrate has a calcium content of 12.0% and a metal ratio of 12.

Examples 1–43 illustrate various means for preparing overbased materials suitable for use in conversion to the non-Newtonian colloidal disperse systems utilized in the present invention. Obviously, it is within the skill of the art to vary these examples to produce any desired overbased material. Thus, other acidic materials such as mentioned herebefore can be substituted for the $CO_2$, $SO_2$, and acetic acid used in the above examples. Similarly, other metal bases can be employed in lieu of the metal base used in any given example. Or mixtures of bases and/or mixtures of materials which can be overbased can be utilized. Similarly, the amount of mineral oil or other non-polar, inert, organic liquid used as the overbasing medium can be varied widely both during overbasing and in the overbased product.

Examples 44–84 illustrate the conversion of Newtonian overbased materials into non-Newtonian colloidal disperse systems by homogenization with conversion agents.

EXAMPLE 44

To 733 grams of the overbased material of Example 5(a) there is added 179 grams of acetic acid and 275 grams of a mineral oil (having a viscosity of 2000 SUS at 1000° F.) at 90° C. in 1.5 hours with vigorous agitation. The mixture is then homogenized at 150° C. for 2 hours and the resulting material is the desired colloidal disperse system.

EXAMPLE 45

A mixture of 960 grams of the overbased material of Example 5(b), 256 grams of acetic acid, and 300 grams of a mineral oil (having a viscosity of 2000 SUS at 100° C.) is homogenized by vigorous stirring at 150° C. for 2 hours. The resulting product is a non-Newtonian colloidal disperse system of the type contemplated for use by the present invention.

The overbased material of Examples 44 and 45 can be converted without the addition of additional mineral oil or if another inert organic liquid is substituted for the mineral oil.

EXAMPLE 46

A mixture of 150 parts of the overbased material of Example 6, 15 parts of methyl alcohol, 10.5 parts of amyl alcohol, and 45 parts of water is heated under reflux conditions at 71°–74° C. for 13 hours whereupon the mixture gels. The gel is heated for 6 hours at 144° C., diluted with 126 parts of the mineral oil of the type used in Example 43 above, the diluted mixture heated to 144° C. for an additional 4.5 hours. The resulting thickened product is a colloidal disperse system. Again, it is not necessary that the material be diluted with mineral oil in order to be useful. The gel itself which results from the initial homogenization of the overbased material and the lower alkanol mixture is a particularly useful colloidal disperse system for incorporating into resinous compositions.

EXAMPLE 47

A mixture of 1,000 grams of the product of Example 12, 80 grams of methanol, 40 grams of mixed primary amyl alcohols (containing about 65% by weight of normal amyl alcohol, 3% by weight of isoamyl alcohol, and 32% by weight of 2-methyl-1-butyl alcohol) and 80 grams of water are introduced into a reaction vessel and heated to 70° C. and maintained at that temperature for 4.2 hours. The overbased material is converted to a gelatinous mass, the latter is stirred and heated at 150° C. for a period of about 2 hours to remove substantially all the alcohols and water. The residue is a dark green gel, which is a particularly useful colloidal disperse system.

EXAMPLE 48

The procedure of Example 47 is repeated except that 120 grams of water is used to replace the water-alkanol mixture employed as the conversion agent therein. Conversion of the Newtonian overbased material into the non-Newtonian colloidal disperse system requires about 5 hours of homogenization. The disperse system is in the form of a gel.

EXAMPLE 49

To 600 parts by weight of the overbased material of Example 6, there is added 300 parts of dioctylphthalate, 48 parts of methanol, 36 parts of isopropyl alcohol, and 36 parts of water. The mixture is heated to 70°–77° C. and maintained at this temperature for 4 hours during which the mixture becomes more viscous. The viscous solution is then blown with carbon dioxide for 1 hour until substantially neutral to phenolphthalein. The alcohols and water are removed by heating to approximately 150° C. The residue is the desired colloidal disperse system.

EXAMPLE 50

To 800 parts of the overbased material of Example 6, there is added 300 parts of kerosene, 120 parts of an alcohol: water mixture comprising 64 parts of methanol, 32 parts of water and 32 parts of the primary amyl alcohol mixture of Example 46. The mixture is heated to 75° C. and maintained at this temperature for 2 hours during which time the viscosity of the mixture increases. The water and alcohols are removed by heating the mixture to about 150° C. while blowing with nitrogen for 1 hour. The residue is the desired colloidal disperse system having the consistency of a gel.

EXAMPLE 51

A mixture of 340 parts of the product of Example 6, 68 parts of an alcohol:water solution consisting of 27.2 parts of methanol, 20.4 parts of isopropyl alcohol and 20.4 parts of water, and 170 parts of heptane is heated to 65° C. During this period, the viscosity of the mixture increases from an initial value of 6,250 to 54,000.

The thickened colloidal disperse system is further neutralized by blowing the carbon dioxide at the rate of 5 lbs per hour for 1 hour. The resulting mass is found to have a neutralization number of 0.87 (acid to phenolphthalein indicator).

EXAMPLE 52

The procedure of Example 51 is repeated except that the calcium overbased material of Example 6 is replaced by an equivalent amount of the cadmium and barium overbased material of Example 17. Xylene (200 parts) is used in lieu of the heptane and the further carbonation step is omitted.

EXAMPLE 53

A mixture of 500 parts of the overbased material of Example 6, 312 parts of kerosene, 40 parts of methylethyl ketone, 20 parts of isopropyl alcohol, and 50 parts of water is prepared and heated to 75° C. The mixture is maintained at a temperature of 70°–75° C. for 5 hours and then heated to 150° C. to remove the volatile components. The mixture is thereafter blown with ammonia for 30 minutes to remove most of the final traces of volatile materials and thereafter permitted to cool to room temperature. The residue is a brownish-tan colloidal disperse system in the form of a gel.

EXAMPLE 54

A mixture of 500 parts of the product of Example 6, 312 parts of kerosene, 40 parts of acetone, and 60 parts of water is heated to reflux and maintained at this temperature for 5 hours with stirring. The temperature of the material is then raised to about 155° C. while removing the volatile components. The residue is a viscous gel-like material which is the desired colloidal disperse system.

EXAMPLE 55

The procedure of Example 54 is repeated with the substitution of 312 parts of heptane for the kerosene and 60 parts of water for the acetone-water mixture therein. At the completion of the homogenization, hydrogen gas is bubbled through the gel to facilitate the removal of water and any other volatile components.

EXAMPLE 56

To 500 parts of the overbased material of Example 9, there is added 312 parts of kerosene, 40 parts of o-cresol, and 50 parts of water. This mixture is heated to the reflux temperature (70°–75° C.) and maintained at this temperature for 5 hours. The volatile components are then removed from this mixture by heating to 150° C. over a period of 2 hours. The residue is the desired colloidal disperse system containing about 16% by weight of kerosene.

EXAMPLE 57

A mixture of 500 parts of the overbased material of Example 5(a) and 312 parts of heptane is heated to 80° C. whereupon 140 parts of glacial acetic acid (99.8% by weight) is added dropwise over a period of 5 hours. The mixture is then heated to 150° C. to remove the volatile components. The resulting gel-like material is the desired colloidal disperse system.

EXAMPLE 58

The procedure of Example 57 is repeated except that 232 parts of boric acid is used in lieu of the acetic acid. The desired gel is produced.

EXAMPLE 59

The procedure of Example 55 is repeated except that the water is replaced by 40 parts of methanol and 40 parts of diethylene triamine. Upon completion of the homogenization, a gel-like collidal disperse system is produced.

EXAMPLE 60

A mixture of 500 parts of the product of Example 6 and 300 parts of heptane is heated to 80° C. and 68 parts of anthranilic acid is added over a period of 1 hour while maintaining the reaction temperature between 80° and 95° C. The reaction mixture is then heated to 150° C. over a 2 hour period and then blown with nitrogen for 15 minutes to remove the volatile components. The resulting colloidal disperse system is a moderately stiff gel.

EXAMPLE 61

The procedure of Example 60 is repeated except that the anthranilic acid is replaced by 87 parts of adipic acid. The resulting product is very viscous and is the desired colloidal disperse system. This gel can be diluted, if desired, with mineral oil or any of the other materials said to be suitable for disperse mediums hereinabove.

EXAMPLE 62

A mixture of 500 parts of the product of Example 8 and 300 parts of heptane is heated to 80° C. whereupon 148 parts of glacial acetic acid is added over a period of 1 hour while maintaining the temperature within the range of about 80°–88° C. The mixture is then heated to 150° C. to remove the volatile components. The residue is a viscous gel which is useful for incorporation into the polymeric resins of the present invention. It may also be diluted with a material suitable as a disperse medium to facilitate incorporation into resinous compositions.

EXAMPLE 63

A mixture of 300 parts of toluene and 500 parts of an overbased material prepared according to the procedure of Example 7 and having a sulfate ash content of 41.8% is heated to 80° C. whereupon 124 parts of glacial acetic acid is added over a period of 1 hour. The mixture is then heated to 175° C. to remove the volatile components. During this heating, the reaction mixture becomes very viscous and 380 parts of mineral oil is added to facilitate the removal of the volatile components. The resulting colloidal disperse system is a very viscous grease-like material.

EXAMPLE 64

A mixture of 700 parts of the overbased material of Example 5(b), 70 parts of water, and 350 parts of toluene is heated to reflux and blown with carbon dioxide at the rate of 1 cubic foot per hour for 1 hour. The reaction product is a soft gel.

EXAMPLE 65

The procedure of Example 61 is repeated except that the adipic acid is replaced by 450 grams of di(4-methylamyl) phosphorodithioic acid. The resulting material is a gel.

EXAMPLE 66

The procedure of Example 59 is repeated except that the methanol-amine mixture is replaced by 250 parts of a phosphorus acid obtained by treating with steam at 150° C. the product obtained by reacting 1000 parts of polyisobutene having a molecular weight of about 60,000, with 24 parts of phosphorus pentasulfide. The product is a viscous brown gel-like colloidal disperse system.

EXAMPLE 67

The procedure of Example 63 is repeated except that the overbased material therein is replaced by an equivalent amount of the potassium overbased material of Example 18 and the heptane is replaced by an equivalent amount of toluene.

EXAMPLE 68

The overbased material of Example 6 is isolated as a dry powder by precipitation out of a benzene solution through the addition thereto of acetone. The precipitate is washed with acetone and dried.

A mixture of 45 parts of a toluene solution of the above powder (364 parts of toluene added to 500 parts of the powder to produce a solution having a sulfate ash content of 43%), 36 parts of methanol, 27 parts of water, and 18 parts of mixed isomeric primary amyl alcohols (described in Example 47) is heated to a temperature within the range of 70°–75° C. The mixture is maintained at this temperature for 2.5 hours and then heated to remove the alkanols. The resulting material is a colloidal disperse system substantially free from any mineral oil. If desired, the toluene present in the colloidal disperse system as the disperse medium can be removed by first diluting the disperse system with mineral oil and thereafter heating the diluted mixture to a temperature of about 160° C. whereupon the toluene is vaporized.

EXAMPLE 69

Calcium overbased material similar to that prepared in Example 6 is made by substituting xylene for the mineral oil used therein. The resulting overbased material has a xylene content of about 25% and a sulfate ash content of 39.3%. This overbased material is converted to a colloidal disperse system by homogenizing 100 parts of the overbased material with 8 parts of methanol, 4 parts of the amyl alcohol mixture of Example 47, and 6 parts of water. The reaction mass is mixed for 6 hours while maintaining the temperature at 75°–78° C. Thereafter, the disperse system is heated to remove the alkanols and water. If desired, the gel can be diluted by the addition of mineral oil, toluene, xylene, or any other suitable disperse medium.

EXAMPLE 70

A solution of 1,000 grams of the gel-like colloidal disperse system of Example 46 is dissolved in 1,000 grams of toluene by continuous agitation of these two components for about 3 hours. A mixture of 1,000 grams of the resulting solution, 20 grams of water, and 20 grams of methanol are added to a 3-liter flask. Thereafter, 92.5 grams of calcium hydroxide is slowly added to the flask with stirring. An exothermic reaction takes place raising the temperature to 32° C. The entire reaction mass is then heated to about 60° C. over a 0.25 hour period. The heated mass is then blown with carbon dioxide at the rate of 3 standard cubic feet per hour for 1 hour while maintaining the temperature at 60°–70° C. At the conclusion of the carbonation, the mass is heated to about 150° C. over a 0.75 hour period to remove water, methanol, and toluene. The resulting product is a clear, light brown colloidal disperse system in the form of a gel. In this manner additional metal-containing particles are incorporated into the colloidal disperse system.

At the conclusion of the carbonation step and prior to removing the water, methanol, and toluene, more calcium hydroxide could have been added to the mixture and the carbonation step repeated in order to add still additional metal-containing particles to the colloidal disperse system.

EXAMPLE 71

A mixture of 1200 grams of the gel produced according to Example 46, 600 grams of toluene, and 48 grams of water is blown with carbon dioxide at 2 standard cubic feet per hour while maintaining the temperature at 55°–65° C. for 1 hour. The carbonated reaction mass is then heated at 150° C. for 1.75 hours to remove the water and toluene. This procedure improves the texture of the colloidal disperse systems and converts any calcium oxide or calcium hydroxide present in the gel produced according to Example 45 into calcium carbonate particles.

EXAMPLE 72

A mixture comprising 300 grams of water, 70 grams of the amyl alcohol mixture identified in Example 47 above, 100 grams of methanol, and 1000 grams of a barium overbased oleic acid, prepared according to the general technique of Example 3 by substituting oleic acid for the petrosulfonic acid used therein, and having a metal ratio of about 3.5 is thoroughly mixed for about 2.5 hours while maintaining the temperature within the range of from about 72°–74° C. At this point the resulting colloidal disperse system is in the form of a very soft gel. This material is then heated to about 150° C. for a 2 hour period to expel methanol, the amyl alcohols, and water. Upon removal of these liquids, the colloidal disperse system is a moderately stiff, gel-like material.

EXAMPLE 73

A dark brown colloidal disperse system in the form of a very stiff gel is prepared from the product of Example 39 using a mixture of 64 grams of methanol and 80 grams of water as the conversion agent to convert 800 grams of the overbased material. After the conversion process, the resulting disperse system is heated to about 150° C. to remove the alcohol and water.

EXAMPLE 73A 5000 grams of the product of Example 39A are placed in a resin reactor equipped with a heating mantle, thermocouple, gas-inlet tube, condenser and metal stirrer, and heated to 40° C. with stirring. Carbon dioxide is bubbled through the mix at the rate of one cubic foot per hour for 2.4 hours, the temperature of the mix varying from 40° C. to 44° C. 282.6 grams of isopropyl alcohol, 282.6 grams of methanol and 434.8 grams of distilled water are added to the mix over a five minute period. The mix is heated to 78° C. and refluxed for 30 minutes. 667 grams of SC Solvent 100 are added to the mix. The reactor is equipped with a trap. Isopropyl alcohol, methanol and water are stripped from the mix by bubbling nitrogen at two cubic feet per hour through the mix over a period of five hours while maintaining the temperature of the mix at 160° C. The mix is dried to 0.05% by weight water content and then cooled to room temperature. The solids content is adjusted to 60% solids with SC Solvent 100.

The polyisocyanate is used in an amount sufficient to react with the active hydrogen atoms (as determined by the Zerewitinoff method, J.A.C.S. Vol. 49, p. 3181 (1927)) in the acid esters of phosphoric acids containing component provided in accordance with the present invention to provide the desired degree of cross-linking and chain extension to obtain the desired resistance to chemicals, abrasion, corrosion, etc.

The Acidic Esters of Phosphoric Acids

The acidic esters of phosphoric acids are a well-known class of organic compounds which are derived from phosphorus containing reactants such as phosphorus pentoxide, phosphorus oxychloride, phosphoric acids, polyphosphoric acids, etc., and an alcoholic or phenolic compound of the type ROH according to known procedures. The term "acidic ester" is intended to encompass those esters wherein there is at least one acid hydrogen atom attached through an oxygen (i.e., H—O) to phosphorus in the ester molecules. Accordingly, the "acidic esters" are mono- or diesters of phosphoric acids.

The alcoholic and phenolic compounds which can be used to prepare the acidic esters are selected from the mono- and polyhydric aliphatic alcohols including cycloaliphatic alcohols, aliphatic substituted phenols, and mixtures of these including mixtures of aliphatic alcohols, mixtures of cycloaliphatic alcohols, mixtures of aliphatic-substituted phenols, and mixtures of any of these.

Accordingly, in the compound ROH, R is an aliphatic, cycloaliphatic, aryl or aliphatic substituted aryl radical. Preferably, these are hydrocarbon or hydroxy-substituted hydrocarbon radicals. In other words, the alcoholic portion of the acidic esters, i.e., —OR, is the oxy radical which is the residue of the alcohol after removal of the hydroxyl hydrogen. Normally the alcoholic portion will be hydrocarbyloxy or hydroxyl-substituted hydrocarbyloxy.

The alcohols and phenols represented by the formula ROH normally contain up to about forty carbons although, in the case of polymeric alcohols and phenols or polymer substituted alcohols and phenols, molecular weights of up to about 10,000 are acceptable. Suitable members of the group ROH include the mono- and polyhydric alkanols and alkenols containing up to about ten hydroxy groups, preferably those having up to thirty carbons; mono- and polyhydric cycloaliphatic alcohols, particularly those containing 5 and 6 carbons in the rings thereof including cycloalkanols, cycloalkenols, cycloalkyl-substituted alkanols and alkenols, cycloalkenyl-substituted alkanols and alkenols, aliphatic hydrocarbon substituted (e.g., alkyl, alkenyl, or olefin polymer substituted) cyclo aliphatic alcohols of the type indicated immediately above; phenols, naphthols, and aliphatic hydrocarbon-substituted phenols and naphthols wherein the aliphatic substituent can be alkyl, alkenyl, or olefin polymer substituent, etc. In addition to the hydroxy groups present in these alcohols and phenols, other substituents such as ether linkages (—O—), lower alkoxy, lower alkenoxy, alkyl mercapto, alkenyl mercapto, halo, carbo hydrocarbyloxy (e.g.,

hydrocarbyl), nitro, etc., may be present so long as they do not interfere with the formation of the acidic phosphorus esters.

Representative phenolic compounds of the formula ROH are phenol, 2-chlorophenol beta-naphthols, alpha-naphthols, cresol, resorcinol, catechol, P,P'-dihydroxy biphenyl, and the corresponding aliphatic hydrocarbon-substituted phenolic compounds such as 2,4-dibutyl-phenol, propenetetramer substituted phenol, didodecyl-phenol, diisooctyl phenol, hexylresorcinol, alkyl-substituted 4,4'-methylene-bis-phenol, alpha-decyl-beta-naphthol, polyiso-butene(molecular weight-1000)substituted phenol, polypropylene(molecular weight-1500)substituted phenol, 4-cyclohexylphenol. Aliphatic hydrocarbon substituted phenols characterized by a molecular weight of up to about 100,000 and preferably up to about 5000 having from one to three aliphatic hydrocarbon substituents constitute a preferred class of phenolic compounds.

The aliphatic hydrocarbon substituent may be an alkyl substituent such as methyl, ethyl, isopropyl, n-butyl, tert-butyl, n-amyl, isoamyl, tert-amyl, n-hexyl, decyl, dodecyl. Other low molecular weight substituents include the unsaturated radicals such as allyl, propargyl, etc.

The sources of the substituent also include the substantially saturated polymers of mono-olefins having from 2 to about 8 carbon atoms. The especially useful polymers are the polymers of 1-mono-olefins such as ethylene, propene, 1-butene, isobutene, and 1-hexane. Polymers of medial olefins, i.e., olefins in which the olefinic linkage is not at the terminal position, likewise are useful. They are illustrated by 2-butene, 3-pentene, and 4-octene.

Also useful as substituents are the interpolymers of the olefins such as those illustrated above with other interpolymerizable olefinic substances such as cyclic olefins, and polyolefins. Such interpolymers include, for example, those prepared by polymerizing isobutene with butadiene; propene with isoprene; ethylene with piperylene; isobutene with chloroprene; 1-hexene with 1,3-hexadiene; 1-octene with 1-hexene; 1-heptene with 1-pentene; 3-methyl-1-butene with 1-octene; 3,3-dimethyl-1-pentene with 1-hexene; etc.

The relative proportions of the mono-olefins to the other monomers in the interpolymers influence the stability and oil-solubility of the final acidic, phosphorus-containing compositions derived from such interpolymers. Thus, for reasons of oil-solubility and stablity the interpolymers should be aliphatic and substantially saturated, i.e., they should contain about 80% preferably at least about 95%, on a weight basis of units derived from the aliphatic mono-olefins and no more than about 5% of olefinic linkages based on the total number of carbon-to-carbon covalent linkages. In most instances, the percentage of olefinic linkages should be less than about 2% of the total number of carbon-to-carbon covalent linkages.

Specific examples of such interpolymers include co-polymers of 95% (by weight) of isobutene with 5% of 1-hexene; terpolymer of 98% of isobutene with 1% of piperylene and 1% of chloroprene; terpolymer of 95% of isobutene with 2% of 1-butene and 3% of 1-hexene; terpolymer of 60% of isobutene with 20% of 1-pentene and 20% of 1-octene; copolymer of 80% of 1-hexene and 20% of 1-heptene; terpolymer of 90% of isobutene with 2% of cyclohexene and 8% of propene; and co-polymer of 80% of ethylene and 20% of propene.

EXAMPLE 74

1000 grams of the overbased material of Example 40 is converted to a colloidal disperse system by using as a conversion agent a mixture of 100 grams of methanol and 300 grams of water. The mixture is stirred for 7 hours at a temperature within the range of 72°–80° C. At the conclusion of the mixing, the resulting mass is heated gradually to a temperature of about 150° C. over a 3 hour period to remove all volatile liquid contained therein. Upon removal of all volatile solvents, a tan powder is obtained. By thoroughly mixing this tan powder to a suitable orgaic liquid such as naphtha, it is again transformed into a colloidal disperse system.

EXAMPLE 75

A mixture of 1000 grams of the product of Example 41, 100 grams of water, 80 grams of methanol, and 300 grams of naphtha are mixed and heated to 72° C. under reflux conditions for about 5 hours. A light brown viscous liquid material is formed which is the desired colloidal disperse system. This liquid is removed and consists of the colloidal disperse system wherein about 11.8% of the disperse medium is mineral oil and 88% is naphtha.

Following the techniques of Example 46 additional overbased materials as indicated below are converted to the corresponding colloidal disperse systems.

| Example No. | Overbased material converted to colloidal disperse system |
|---|---|
| 76 | Example 15 |
| 77 | Example 21 |
| 78 | Example 23 |
| 79 | Example 24(a) |
| 80 | Example 28 |
| 81 | Example 31 |
| 82 | Example 39 |
| 83 | Example 40 |

EXAMPLE 84

A mixture of 1000 parts of the overbased material of Example 43 and 388.4 parts of mineral oil is heated to 55°–60° C. and blown with carbon dioxide until the base number is about one. 56.5 parts methanol and 43.5 parts water are added and the whole is mixed at 75°–80° C. under reflux until the viscosity increases to a maximum. The maximum viscosity can be determined by visual inspection. 472.5 parts of 97.3% calcium hydroxide and 675.4 parts of mineral oil are added and the whole is blown with carbon dioxide at a temperature of 75°–80° C. until the whole is substantially neutral. Alcohol and water are removed by blowing the whole with nitrogen at 150° C. The resulting product has a calcium content of 13.75% and a metal ratio of 36.

The change in rheological properties associated with conversion of a Newtonian overbased material into a non-Newtonian colloidal disperse system is demonstrated by the Brookfield Viscometer data derived from overbased materials and colloidal disperse systems prepared therefrom. In the following samples, the overbased material and the colloidal disperse systems are prepared according to the above-discussed and exemplified techniques. In each case, after preparation of the overbased material and the colloidal disperse system, each is blended with dioctylphthalate (DOP) so that the compositions tested in the viscometer contain 33.3% by weight DOP (Samples A, B, and C) or 50% by weight DOP (Sample D). In Samples A–C, the acidic material used in preparing the overbased material is carbon dioxide while in Sample D, acetic acid is used. The samples each are identified by numbers, (1) and (2). The first is the overbased material-DOP composition and the second the colloidal disperse system-DOP composition. The overbased materials of the samples are further characterized as follows:

Sample A

Calcium overbased petrosulfonic acid having a metal ratio of about 12.2.

Sample B

Barium overbased oleic acid having a metal ratio of about 3.5

Sample C

Barium overbased petrosulfonic acid having a metal ratio of about 2.5.

Sample D

Calcium overbased commercial higher fatty acid mixture having a metal ratio of about 5.

The Brookfield Viscometer data for these compositions is tabulated below. The data of all samples is collected at 25° C.

| | BROOKFIELD VISCOMETER DATA (Centipoises) | | | | | | | |
|---|---|---|---|---|---|---|---|---|
| | Sample A | | Sample B | | Sample C | | Sample D | |
| R.p.m. | (1) | (2) | (1) | (2) | (1) | (2) | (1) | (2) |
| 6 | 230 | 9,620 | 80 | 15,240 | 240 | 11,320 | 114 | 8,820 |
| 12 | 235 | 2,053 | 90 | 8,530 | 230 | 6,980 | 103 | 5,220 |
| 30 | 239 | (1) | 88 | (1) | 224 | 4,008 | 100 | 2,892 |

(1)Off scale.

The Organic Polyisocyanates

The organic polyisocyanates which are provided in accordance with the present invention include aliphatic, alkylaromatic and aromatic polyisocyanates. Typical organic polyisocyanates include aromatic polyisocyanates such as 2,4- and 2,6-toluene diisocyanate, 2,2'-, 2,4'-, and 4,4'-diphenylmethane-diisocyanate, triphenylmethane-triisocyanate, biphenyl-diisocyanate, m- or p- phenylene-diisocyanate and 1,5-naphthalenediisocyanate and aliphatic polyisocyanates such as isophorone-diisocyanate, 1,4-tetramethylene diisocyanate and hexamethylene diisocyanate. Preferred are isophorone diisocyanate, the toluene diisocyanates and mixtures of 2,2'-, 2,4'-, and 4,4'-diphenylmethane diisocyanate and polyphenyl-polymethylenepolyisocyanates. The polyisocyanates may be used individually or as mixtures.

Good results are obtained when polymeric polyisocyanates having a functionality greater than 2.0 are utilized. Exemplary polyisocyanates include the following: crude diphenylmethane-4,4'-diisocyanate, commonly referred to as crude MDI having a functionality of about 2.5 to 2.6; crude toluene diisocyanate, commonly referred to as crude TDI, containing about 85% TDI and about 15% polymeric isocyanate and having a functionality of about 2.1; and polymethylene polyphenyl isocyanate, referred to as PAPI, having an isocyanate functionality greater than 2.4.

The aliphatic hydrocarbon-substituted phenols may be the mono- or the poly-substituted phenols, i.e., phenols having two or more substituents. A convenient method for preparing the high molecular weight substituted phenols comprises the alkylation of phenol with the olefin polymer in the presence of a Freidel-Crafts catalyst such as boron fluoride, aluminum chloride, aluminum bromide, ferric chloride, zinc chloride, diatomaceous earth, or the like. In lieu of the olefin polymer, a halogenated olefin polymer may be used to alkylate the phenol. In the latter method the olefin polymer is first, e.g., chlorinated to a product having one or more atomic proportions of chlorine per molecule of the olefin polymer and the chlorinated olefin polymer is then allowed to react with the phenol in the presence of a Friedel-Crafts catalyst. More than one mole of the olefin polymer may be made to react with phenol so that the product may contain two or three olefin polymer substituents. The preparation of the substituted phenols by these and other methods is well known in the art and need not be described here in greater detail.

Other suitable alcohols of the formula ROH include methanol, ethanol, isooctanol, dodecanol, cyclohexanol, cyclopentanol, behenyl alcohol, hexatriacontanol, neopentyl alcohol, isybutyl alcohol, benzyl alcohol, beta-phenylethyl alcohol, 2-methylcyclohexanol, bethchloroethanol, monomethyl ether of ethylene glycol, monobutyl ether of ethylene glycol, monopropyl ether of diethylene glycol, monododecyl ether of triethylene glycol, monooleate of ethylene glycol, monostearate of diethylene glycol, secpentyl alcohol, tert-butyl alcohol, 5-bromo-dodecanol, nitro-octadecanol and dioleate of glycerol. The polyhydric alcohols preferably contain from 2 to about 10 hydroxy radicals. They are illustrated by, for example, ethylene glycol, diethylene glycol, triethylene glycol, tetraethylene glycol, dipropylene glycol, tripropylene glycol, dibutylene glycol, tributylene glycol, and other alkylene glycols in which the alkylene radical contains from 2 to about 8 carbon atoms. Other useful polyhydric alcohols include glycerol, monooleate of glycerol, monostearate of glycerol, monomethyl ether of glycerol, pentaerythritol, 9,10-dihydroxy stearic acid, methyl ester of 9,10-dihydroxy stearic acid, 1,2-butanediol, 2,3-hexanediol, 2,4-hexanediol, pinacol, erythritol, arbitol, sorbitol, mannitol, 1,2-cyclohexanediol, and xylylene glycol. Carbohydrates such as sugars, starches, celluloses, etc., likewise may yield the esters of this invention. The carbohydrates may be exemplified by a glucose, fructose, sucrose, rhamose, mannose, glyceraldeyde, and galactose.

The esters of this invention may also be derived from unsaturated alcohols such as allyl alcohol, cinnamyl alcohol, proparagyl alcohol, 1-cyclohexene-3-ol, an oleyl alcohol. Still other classes of the alcohols capable of yielding the esters of this invention comprises the ether-alcohols and amino-alcohols including, for example, the oxy-alkylene-, oxy-arylene-, and amino-arylene-substituted alcohols having one or more oxy-alkylene, amino-alkylene or amino-arylene oxy-arylene radicals. They are exemplified by Cellosolve, Carbitol, phenoxyethanol, heptylphenyl-(oxypropylene)$_6$-H, octyl-(oxyethylene)$_{30}$-H, phenyl-(oxyoctylene)$_2$-H, mono(heptylphenyloxypropylene)-substituted glycerol, poly(styrene oxide), amino-ethanol, 3-amino ethylpentanol, di(hydroxyethyl)amine, p-aminophenol, tri(hydroxypropyl)amine, N-hydroxyethyl ethylene diamine, N,N,N',N'-tetrahydroxytrimethylene diamine, and the like. Of this group, the etheralcohols having up to about 150 oxyalkylene radicals in which the alkylene radical contains from 1 to about 8 carbon atoms are preferred.

Various processes for producing acidic esters of phosphoric acids are well known in the art. Suitable acidic esters and/or processes for their preparation are disclosed in U.S. Pat. Nos. 2,005,619; 2,341,565; 2,360,302; 2,698,835; 3,050,487 and 3,055,865. Acidic esters can be prepared according to the process disclosed in U.S. Pat. No. 3,254,111 by eliminating the neutralization step employed therein.

It should be understood that the acidic acid esters used as reactants in the present invention can be a given mono- or diester or a mixture of different mono- and/or diesters or a mixture comprising triesters as well as these acidic esters. However, it is preferred to maintain the ester reactant free from the triesters insofar as possible as they will not function as reactants. Obviously, the weight of the triesters is excluded in determining the weight of acidic acid ester reactant to be employed.

Thus, the acidic phosphorus-containing esters useful in the preparation of the compositions of this invention can be prepared by the reaction of a phenolic composition with phosphorus pentoxide. Phosphoric acid (i.e., dehydrated phosphorus pentoxide) may be used in lieu of the pentoxide. The molar ratio of the phenolic composition to the phosphorus pentoxide in the reaction should be within the range of from about 1:1 to 10:1, the preferred ratio being from 2:1 to 4:1. The reaction is effected simply by mixing the two reactants at a temperature between about 50° C. and 90° C. In some instances, the temperature may be 150° C. to 200° C. or higher, but ordinarily it is below 100° C. Unreacted phenolic compound can be removed or allowed to remain in the acidic ester product which is reacted with the disperse system. The reaction is preferably carried out in the presence of a solvent which facilitates temperature control and mxing of the reactants. The solvent may be any inert fluent substance in which either one or both reactants are soluble, or the product is soluble. Examples of such solvents include aryl hydrocarbons such as benzene, toluene, or xylene; aliphatic hydrocarbons such as n-hexane, cyclohexane, or naphtha; or polar solvents such as diethyl ether, carbitol, dibutyl ether, dioxane, chlorobenzene, nitrobenzene, carbon tetrachloride or chloroform.

The product of the above reaction is acidic and is a mixture of acidic phosphates consisting predominantly of the mono- and the di-esters of phosphoric acids, the ester radical (i.e. alcohol portion, —OR) being derived from the hydroxy compound, ROH.

Another preferred class of acidic phosphorus-containing esters can be obtained by the reaction of phosphorus pentoxide or a phosphoric acid with a mixture of an aliphatic hydrocarbon substituted phenol and a copolymer of allyl alcohol and a styrene. The reaction mechanism by which the acidic ester product is formed is not completely understood but probably involves a reaction between the phosphorus pentoxide and the copolymer of allyl alcohol and a styrene, followed then by reaction of this intermediate product with the substituted phenol. The optimum reaction time is about 4 to 6 hours although a suitable product can be obtained at any point within a period of from about 1 to 10 hours.

The copolymer of allyl alcohol and a styrene preferably is a low molecular weight copolymer prepared from an approximately equimolar mixture of the two monomers. The molecular weight of the copolymer should be within the range of from about 500 to about 5000. A particular preference is expressed for a copolymer of approximately equimolar amounts of allyl alcohol and styrene having a molecular weight of about 1100 to 1500.

The term "a styrene" as used herein refers to styrene or any of the various substituted styrenes such as halogen-substituted styrenes, hydrocarbon-substituted styrenes, alkoxy-styrenes, acyloxy-styrenes, nitrostyrenes, etc. Examples of such substituted styrenes include para-chlorostyrene, para-ethylstyrene, o-phenylstyrene, p-methoxystyrene, m-nitrostyrene, alpha-methylstyrene, and the like. In most instances, however, it is preferred to use styrene itself by reason of its low cost, commercial availability, and excellence as a raw material in the preparation of the acidic phosphorus-containing compositions.

The reaction of phosphorus pentoxide with a hydrocarbon substituted phenol and the copolymer of allyl alcohol and a styrene is carried out simply by mixing the specified reactants, preferably with a solvent, and heating the resulting solution at a temperature within the range of from about 75° C. to 150° C. until the reaction is complete. The earliest stages of the overall reaction produce a cloudy, thickened reaction mixture but as reaction proceeds further, this is changed to a relatively clear, non-viscous solution. The solvent may be removed if desired, but generally the above solution is incorporated into the compositions of this invention with the solvent.

The following examples demonstrate the preparation of representative preferred acidic esters of phosphoric acids suitable for use in accordance with the present invention.

EXAMPLE 85

A polyisobutene-substituted phenol is prepared by mixing 940 parts (by weight) of phenol and 2200 parts of polyisobutene having a molecular weight of 350 at 50°–55° C. in the presence of 30 parts of boron trifluoride. The unused phenol and other volatile substances are removed by heating the alkylated phenol to 220° C./12 mm. The resulting alkylated phenol has a hydroxyl content of 3.7%. A mixture of 490 parts of this alkylated phenol, 50 parts of phosphorus pentoxide, and 180 parts of xylene (molar ratio of the phenol to phosphorus pentoxide being 3:1) is prepared at 38°–50° C. and thereafter heated at 80°–85° C. for 4 hours. The resulting mixture is filtered and the filtrate is a xylene solution of the acidic, phosphorus-containing composition having a phosphorus content of 3.1% and a neutralization number of 76 acid.

EXAMPLE 86

An acidic phosphorus-containing composition is prepared according to the procedure of Example 85 except that the polyisobutene substituent of the phenol reactant has a molecular weight of 1000.

EXAMPLE 87

An acidic, phosphorus-containing composition is prepared according to the procedure of Example 85 except that the phenol reactant is a polypropene-substituted phenol wherein the polypropene substituent has a molecular weight of 2000.

EXAMPLE 88

Para-tertiary amylphenol (1900 parts, 11.6 moles) is melted by heating to 295° C. whereupon 440 parts (3.1 moles) of phosphorus pentoxide is added in 1 hour while maintaining the temperature between 95°–100° C. The mixture is then heated to 155° C. in 5 hours and maintained at this temperature for an additional 5 hours. The mixture is cooled to 95° C. and 585 parts of isobutyl alcohol is added. The mixture is stirred for 30 minutes. The solution is the desired product having a phosphorus content of 6.61%, and a neutralization number (phenolphthalein) of 183 acid.

EXAMPLE 89

A mixture of 286 parts (2 moles) of allyl phenol and 328 parts (2 moles) of para-tertiary amyl phenol is heated to 155°–165° C. and 142 parts (1 mole) of phosphorus pentoxide is added over a period of 1 hour. The reaction mixture is heated at 160°–170° C. for 6 hours. The residue is the desired product having a phosphorus content of 8.04% and a neutralization number (phenolphthalein) of 224 acid.

EXAMPLE 90

Para-tertiary amylphenol (492 parts, 3 moles) is melted by heating to 90° C. wherepon 213 parts (1.5 moles) of phosphorus pentoxide is added in 20 minutes and the reaction temperature is raised to 160° C. The mixture is then heated to 180°–185° C. and maintained at this temperature for a total of 7 hours. The residue is the desired product having a phosphorus content of 12.8% and a neutralization number (phenolphthalein) of 351 acid.

EXAMPLE 91

The procedure of Example 88 is repeated except that the para-tertiary amylphenol is replaced on a molar basis with para-dodecylphenol.

EXAMPLE 92

A mixture of 1412 parts (1.2 moles) of a 1:1 (molar) copolymer of allyl alcohol and styrene having an average molecular weight of 1100, 168 parts (1 mole) of para-tertiary-amyl phenol, 68 parts (0.5 mole) of phosphorus pentoxide and 1648 parts of xylene is prepared at room temperature and then heated at reflux for 6 hours. The reaction is stirred throughout the period. At the end of this time the xylene is removed by distillation to yield a plastic, non-viscous mass. The residue, while still hot, i.e., about 100° C., is diluted with 824 grams of isobutyl alcohol to give a 65% solution of the desired phosphorus composition having a phosphorus content of 1.16% and a neutralization number (phenolphthalein) of 22.6 acid.

EXAMPLE 93

A polyisobutene-substituted phenol is prepared by mixing 940 parts of phenol and 2200 parts of polyisobutene having a molecular weight of 350 at 50°–55° C. in the presence of 30 parts of boron trifluoride, and distilling off the unused phenol and other volatile substances by heating the alkylated phenol to 220° C./12 mm. The resulting alkylated phenol has a hydroxyl content of 3.7%.

A mixture of 1089 parts of xylene and 524 parts of the above prepared polyisobutene-substituted phenol is heated to 50° C. whereupon 523 parts of 1:1 (molar) copolymer of allyl alcohol and styrene having an average molecular weight of 1100 is added over a period of 20 minutes at 50° C. Solution was complete after 1 hour at this temperature. Phosphoric anhydride (52 parts) is added over a period of 15 minutes at 50° C. and the mixture is heated to the boiling point and to 145° C. in 1.2 hours. The mixture is stirred and maintained at this temperature while removing water-xylene azeotrope over a period of 6 hours. The residue is cooled to 40° C. The residue, a 50% solution in xylene, has a phosphorus content of 1.03% and a neutralization number (bromophenol blue) of 20 acid.

EXAMPLE 94

A mixture of 800 parts (0.73 mole) of the copolymer described in Example 92, 272 parts (1.66 moles) of para-tertiary-amyl phenol, 80 parts (0.57 mole) of phosphorus pentoxide, and 1148 parts of xylene is prepared and heated at reflux temperature (132°-140° C.) for 6 hours while the water of the reaction is removed by means of a side-arm water trap. The pressure in the reaction vessel is then lowered to 30 mm. Hg to remove the xylene salt. After all of the xylene has been removed, 616 parts of isobutyl alcohol is added. The resulting product, a 65% solution of the desired acidic phosphorus-containing composition in isobutyl alcohol, has a phosphorus content of 2.0%.

EXAMPLE 95

A mixture of 313 parts (0.284 mole) of the copolymer described in Example 92, 314 parts (0.786 mole) of mono-polyisobutene-substituted phenol wherein the polyisobutene substituent contains an average of about 22 carbon atoms, 31 parts (0.218 mole) of phosphorus pentoxide, and 660 parts of xylene is heated to the reflux temperature (ca. 140° C.) and maintained at this temperature for 6 hours while water is removed by means of a side-arm water trap. Substantially all the xylene is removed by distillation of the mass at 140° C./20 mm. and then the residue is diluted with 350 parts of isobutyl alcohol. The product, a 65% solution of the acidic phosphorus-containing composition in isobutyl alcohol is found to have a phosphorus content of 1.35% and a neutralization number of 16.7.

Additional examples of the acidic phosphorus-containing compositions of this invention are shown in Table II of U.S. Pat. No. 3,453,124, said patent being incorporated herein by reference.

The compositions of the present invention can include one or more organic compounds having two or more active hydrogen atoms admixed with the foregoing acid esters. Such organic compounds having two or more active hydrogen atoms (as determined by the Zerewitinoff method) are compounds having at least one hydroxyl group such as polyethers, polyols and polyesters. In addition to the hydroxyl group, the active hydrogen atoms may be found on amino and carboxyl groups. These organic compounds having two or more active hydrogen atoms can be admixed with the acid esters at levels up to a point wherein about 95% of the total hydroxyl equivalents provided by the mixture of such organic compounds and such acid esters is contributed by such organic compounds.

The polyols that can be admixed with the acid esters are generally primary and secondary hydroxyl-terminated polyoxyalkylene ethers having from 2 to 4 hydroxyl groups and a molecular weight of from about 200 to 10,000.

Examples of polyoxyalkylene polyols include linear and branched polyethers having a plurality of ether linkages and containing at least two hydroxyl groups and being substantially free from functional groups other than hydroxyl groups. Among the polyoxyalkylene polyols which are useful in the practice of this invention are the polypropylene glycols, the polypropylene-ethylene glycols, and the polybutylene glycols. Polymers and copolymers of alkylene oxides are also useful in accordance with this invention as well as the block copolymers of ethylene oxide and propylene oxide and the like. Among the polymers and copolymers that deserve some special mention are the ethylene oxide, propylene oxide and butylene oxide adducts of ethylene glycol, propylene glycol, diethylene glycol, dipropylene glycol, triethylene glycol, 2-ethylhexanediol-1,3-glycerol, 1,2,6-hexanetriol, trimethylolpropane, trimethylolethane, pentaerythritol, triethanolamine, tri-isopropanolamine, ethylenediamine, and ethanolamine. Linear and branched copolyethers of other alkylene oxides are also useful in making the products of this invention as well as the polypropylene diols, triols and tetrols end-blocked with ethylene oxide to provide primary hydroxyl groups in the polymer and having molecular weights of from about 2,000 to 5,000.

When desired, cross-linking materials having from 2 to 8 hydroxyl groups can be admixed with the acid esters to increase cross link density. They have molecular weights of from about 60 to 600. Only small amounts of such materials are generally needed (about 0.3 to 10 mols per 100 mols of polyol). Examples of such cross-linking agents are ethylene glycol, diethylene glycol, propylene glycol, butanediol-1,4-dipropylene glycol, glycerol, trimethylolpropane, butanetriols, hexanetriols, tri-methylolphenol, various tetrols, such as erythritol and pentaerythritol, pentols, hexols, such as dipentaerythritol and sorbitol, as well as alkyl glucosides, carbohydrates, polyhydroxy fatty acid esters such as castor oil and polyoxy alkylated derivatives of polyfunctional compounds having three or more reactive hydrogen atoms, such as, for example, the reaction product of trimethylolpropane, glycerol, 1,2,6-hexanetriol, sorbitol and other polyols with ethylene oxide, propylene oxide, or other alkylene epoxides or mixtures thereof, e.g., mixtures of ethylene and propylene oxides.

In addition to the aliphatic polyols and the polyether polyols, polyester resins containing hydroxyl groups can be admixed with the acid esters. Suitable polyester resins may be prepared by reacting an excess of polyol with a polycarboxylic acid, especially dicarboxylic acids. Typical polyols include: ethylene glycol, propylene glycol, butylene glycol, glycerol, trimethylolpropane, trimethylolethane, 1,2,6-hexanetriol, pentaerythritol, diethylene glycol, dipropylene glycol and the like. Typical carboxylic acids include: adipic acid, succinic acid, azaleic acid, phthalic acid, isophthalic acid, terephthalic acid, chlorendic acid and tetrabromophthalic acid. Long chain dimer acids may be used to form useful polyols by esterification with polyols, especially diols such as ethylene glycol and the like.

Another useful class of polyols which can be admixed with the acid esters are the trialkanolamines which, by reaction with alkylene oxides, form adducts of suitable molecular weight, and the alkylene oxide adducts thereof. Illustrative of the lower molecular weight trialkanolamines include triethanolamine, triisopropanolamine and tributaneolamine. The alkylene oxide adducts which can be employed are preferably those wherein the oxyalkylene moieties thereof have from 2 to 4 carbon atoms.

Alkylene oxide adducts of mono- and polyamines and also ammonia can be used as polyols that can be admixed with the acid esters. These may be termed aminic polyols. The mono- and polyamines are preferably reacted with alkylene oxides which have 2 to 4 carbon atoms; for example, ethylene oxide, 1,2-epoxypropane, the epoxybutanes, and mixtures thereof. Mono- and polyamines suitable for reaction with alkylene oxides include, among others, methylamine, ethylamine, isopropylamine, butylamine, benzylamine, aniline, the toluidines, naphthylamines, 1,3-butanediamine, 1,3-propanediamine, 1,4-butanediamine, 1,2-, 1,3-, 1,4-, 1,5-, and 1,6-hexanediamine, phenylenediamines, toluenediamines, naphthalenediamines and the like. Among the compounds of the above groups which are of particular interest are, among others, N,N,N',N'-tetrakis(2-hydroxypropyl)ethylenediamine; N,N,N',N'-tetrakis(2-hydroxypropyul)diethylenetriamine; phenyldiisopropanolamine and higher alkylene oxide adducts of aniline, and the like. Others which deserve particular mention are the alkylene oxide adducts of aniline or substituted aniline/formaldehyde condensation products.

Another material which may be admixed with the acid esters of this invention is castor oil and its derivatives. Also useful are the oxyalkylation products of polyaminepolyamide compounds as obtained by the reaction of dicarboxylic acids with polyamines.

Preparation and Use of the Two-Component Urethane Coating Systems

The organic polyfunctional isocyanate material and the acidic ester material used in accordance with the present invention are provided in separate component packages and are not mixed with each other until the time of application or just prior to the time of application. The colloidal disperse system of the invention can be provided with either or both of the above-indicated separate component packages. Also, as indicated above, the component package containing the acidic ester can also include at least one organic compound having two or more active hydrogen atoms admixed with such acid ester. Pigments can be provided with the acid-ester containing component package. Solvents can be provided with either or both component packages, such solvents being used to facilitate the dispersion of the ingredients of the component package(s) with which it is employed, to facilitate the mixing of the component packages with each other, and to facilitate the application of the resulting composition on a substrate as a coating. The component comprising the organic polyfunctional isocyanate is provided in relation to the component comprising the acidic ester at an effective amount to provide an NCO/OH ratio in the range of about 0.8 to about 1.2, preferably about 0.9 to about 1.1, and most preferably at a ratio of about 1.0.

Each of the individual components of the two-component package comprising the invention is prepared using standard mixing techniques. The specific means by which the colloidal disperse system is incorporated into either or both of the component mixtures does not constitute a critical feature of the present invention. A variety of suitable methods for incorporating the colloidal disperse systems into the component mixtures are readily apparent to those skilled in the art. For example, as the colloidal disperse systems of the invention are liquids or semi-liquids (i.e., gels), they can be mixed directly with the other ingredients of the component package. The disperse systems are mixed with the ingredients of such components in the same manner as any other thixotropic agent or additive. The colloidal disperse system generally comprises about 5% to about 50% by weight, preferably about 15% to about 30% by weight of the overall coating composition provided in accordance with this invention once the two individual components are mixed.

Either or both of the individual components of the inventive composition can be and is preferably dispersed with a solvent. Such solvents should preferably evaporate on standing at ambient temperature. Suitable solvents include hydrocarbon and halo hydrocarbon solvents such as 1,1,1-trichloroethane, benzene, toluene, mineral spirits and turpentine which are especially useful because of their short drying time, but any of the solvents identified as being useful in the preparation of the colloidal disperse systems of the invention can be used.

The compositions of the invention can also include pigments which can provide marked and overall improvement in the resistance of the resulting coatings to corrosion and chemical attack. Such pigments are preferably provided with the colloidal disperse system. If the colloidal disperse system is also provided with the acid ester containing component package, the pigment can be predispersed in the colloidal disperse system. The level of pigmentation can be up to the critical pigment volume concentration of the resulting coating composition. Preferred pigments include red oxide, zinc chrome.

Prior to or at the time of application of the coating compositions of the invention, the individual component packages of such compositions are intimately admixed with each other. These components can be admixed using conventional techniques, the pot life of such mixtures depending upon the particular isocyanate/acid ester system employed, but can exceed, for example, about four hours. The individual components can also be mixed at the time of application, for example, in a twin-feed spray gun. Twin-feed spray apparatus for the application of two-component urethane systems are well known to those skilled in the art and, accordingly, need not be further described herein. The individual component packages can be mixed with each other and then the resulting coating composition can be applied using conventional coating techniques such as, for example, spraying including airless spraying, brushing, dipping, roller coating, etc.

The coating compositions of the invention do not normally require catalysts for curing, although catalysts can be used to speed up the curing time. Preferably such catalysts, when used, are provided with the acid ester containing component package. These catalysts can be any catalyst heretofore used in the art with two-component urethane coating systems. Examples of such catalysts are (1) tertiary phosphines such as trialkylphosphines, dialkylbenzylphosphines, and the like; (2) strong bases such as the alkali and alkaline earth metal hydroxides, alkoxides, and phenoxides; (3) acidic metal salts of strong acids such as stannic chloride, stannous chloride, antimony trichloride, bismuth nitrate, bismuth chloride, and the like; (4) alcoholates and phenolates of various metals such as $Ti(OR)_4$, $Sn(OR)_2$, $Al(OR)_3$, and the like, wherein R is alkyl or aryl, and the reaction products of alcoholates with carboxylic acids, beta-diketones and 2-(N,N-dialkylamino) alkanols, such as the well known chelates of titanium obtained by said or equivalent procedures; (5) organometallic derivatives of tetravalent tin, trivalent and pentavalent As, Sb, and Bi, and metal carbonyls of iron and cobalt; and (6) alkali and alkaline earth metal salts of aliphatic and alicyclic monocarboxylic acids. At least one organic tertiary amine may be included in the reaction mixture as a catalyst. Such organic amines include, among others, triethylene diamine, triphenyl amine, triethylamine, N,N,N',N'-tetramethyl-1,3-butane diamine, N-methyl morpholine, N-ethyl morpholine, N-acetyl morpholine, N-octyl morpholine, N-coco morpholine, N-phenyl morpholine, N-hydroxyl ethyl morpholine, N-hydroxyl methyl morpholine, 4,4'-dithiodimorpholine, dimethyl piperazine, N,N,N',N'-tetramethyl propane diamines, trimethyl aminoethyl piperazine, N,N-dimethyl ethanolamine, dimethyl hexadecylamine, 1-(2-ethyl-1-hexenyl) piperazine, tri-n-octylamine, trimethylamine, N,N-dimethyl benzyl amine, triethanolamine, 1,2,4-trimethylpiperazine, N-methyl dicyclohexylamine, and mixtures thereof.

EXAMPLE 96

Part A

An acid ester of phosphoric acid AEPA is prepared by charging to a reactor 1000 parts of an aromatic solvent, 595 parts of a substituted phenol with a molecular weight of about 300, and 356 parts of an allyl alcohol/styrene copolymer prepared from an equal molar mixture of the two monomers and having a molecular weight in the range of 750 to about 1500. The resulting mix is heated to 96° C. The temperature of the mix is maintained in the range of 96° C. to 109° C. until the copolymer is dissolved in the mix. The mix is cooled to 60° C. and phosphoric anhydride ($P_4O_{10}$) is added. The mix is heated to 147° C. and blown with nitrogen for one hour. The mix is cooled to room temperature.

Part B

A thixotropic sulfonate is prepared by charging to a reactor 1000 parts of a calcium overbase sulfonate with a 16.4% sulfate ash, 325 parts diluent oil and 75 parts of a neutral calcium salt of heptyl phenol formaldehyde. The resulting mix is stirred for fifteen minutes. The temperature of the mix is reduced to below 60° C. 171 parts methyl alcohol, 114 parts of an isobutyl alcohol/isoamyl alcohol mix and 3.6 parts of calcium chloride-water mixture (1.6 parts calcium chloride and 2.0 parts water) are added to the mix. The resulting mixture is stirred for 15 minutes. 148 parts calcium hydroxide (92% reactive) is added to the mix. The mix is stirred for 15 minutes. The mix is carbonated at maximum rate while maintaining the batch temperature in the range of 43°-52° C. until the base number is reduced to 50-65. 98.4 parts calcium hydroxide is added to the mix. The mix is again carbonated at a temperature in the range of 43°-52° C. until a base number of 50-65 is achieved. The foregoing procedure is repeated three more times by adding 96.9 parts calcium hydroxide each time and after each addition carbonating the mix at a temperature in the range of 43°-52° C. until a base number of 50-65 is achieved. 96.9 grams calcium hydroxide are added to the mix. The mix is carbonated at a temperature in the range of 46°-52° C. until a base number of 50-60 is achieved. The mix is dried in two stages, the first stage being flash drying at a temperature of 99°-115° C., the second stage being kettle drying at 160° C. Flush oil and diatomaceous earth are added to the mix to filter the mix. 1000 parts of the resulting product and 400 parts of Stoddard solvent are charged to a reactor. The mix is carbonated with 400% excess of the theoretical carbon dioxide required to reduce the direct base number of the mix to 20. 56 parts methanol and 44 parts water are added to the mix. The mix is maintained at a temperature in the range of 71°-79° C. under reflux conditions until a gel with a viscosity of 3000 centipoise is obtained. The mix is stripped to a maximum water content of 0.5% by weight and the solids content is adjusted with Stoddard solvent.

Part C

A first component package is prepared by mixing the product of Part B with isophorone diisocyanate (IPDI). A second component package is prepared by mixing the product of Part A with SC Solvent 150 (a high-boiling aromatic solvent supplied by Ohio Solvents). A series of coatings with increasing amounts of thixotropic sulfonate is prepared by mixing the two component packages, drawing the mixtures down on untreated steel Q-panels. After allowing seven days for complete cure, the effectiveness of the coatings for preventing corrosion of metals which are exposed to water or moisture is tested by the Salt Fog Corrosion Test (described in ASTM procedure B 117-57T). The results of the 500 hour salt fog exposure are shown below for these compositions. In each case, the amount of each ingredient is expressed as a solvent-free value. The dried film thickness of each of the coatings is 4 mils.

| Sample No. | Weight Percent | | | Undercutting At Scribe mm |
|---|---|---|---|---|
| | Thixotropic Sulfonate | IPDI | AEPA | |
| 1 | 0 | 11.4 | 88.6 | 7 film crazing |
| 2 | 22.8 | 8.8 | 68.4 | 3 |
| 3 | 46.9 | 6.2 | 46.9 | 2.3 |
| 4 | 72.7 | 3.1 | 24.8 | 1.5 |

EXAMPLE 97

Part B of Example 96 is repeated with the exception that the mix is carbonated sufficiently to reduce the direct base number of the mix to zero. 93.9 parts of the carbonated mix is combined with 6.1 parts of isophorone diisocyanate to provide a first component package. 94.2 parts of the product of Part A of Example 96 is combined with 5.8 parts of SC Solvent 150 to provide a second component package.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:
1. A composition comprising:
(A) an organic polyfunctional isocyanate;
(B) a non-Newtonian colloidal disperse system comprising (1) solid metal-containing colloidal particles predisposed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions; and

(C) an acidic ester of a phosphoric acid, the organic portions of said acidic ester being selected from the group consisting of hydrocarbyloxy and hydroxy-substituted hydrocarbyloxy compounds.

2. The composition of claim 1 wherein the disperse medium of (B) is an inert organic liquid, the essential third component is an alkaline earth metal salt of a sulfonic acid soluble in said liquid, and the organic portions of said acidic ester (C) are selected from the class consisting of aliphatic hydrocarbon-substituted aryloxy, aliphatic hydrocarbyloxy, hydroxy-substituted aliphatic hydrocarbyloxy, oxy radicals of copolymers of allyl alcohols and styrene.

3. The composition of claim 1 wherein the disperse medium of (B) is an inert organic liquid, at least a portion being mineral oil, the essential third component is an oil-soluble alkaline earth metal salt selected from calcium and barium salt of oil-soluble sulfonic acids and the organic portions of said acidic ester (C) are selected from the class consisting of aliphatic hydrocarbon substituted-phenoxy radicals and oxy radicals of a copolymer of allyl alcohol and a styrene.

4. The composition of claim 3 wherein the aliphatic hydrocarbon substituents on said phenoxy radical is an olefin polymer substituent, said phenoxy radical having a molecular weight of up to about 5000.

5. The composition of claim 3 wherein said phenoxy radical is para-tertiary amylphenoxy.

6. The composition of claim 3 wherein the ratio of monomer units in said copolymer is about 1:1 and the molecular weight is about 1100 to about 1500.

7. The composition of claim 1 wherein the disperse medium of (B) is mineral oil, the essential third component is a calcium petrosulfonate, and the organic portions of said acidic ester (C) are selected from the class consisting of aliphatic hydrocarbon-substituted phenoxy radicals and oxy radicals of a copolymer of allyl alcohol and styrene having the ratio of monomer units in said copolymer of about 1:1 and a molecular weight of about 1100 to about 1500.

8. The composition of claim 7 wherein the organic portions of said acidic ester are aliphatic hydrocarbon-substituted phenoxy radicals.

9. The composition of claim 1 with the solid metal-containing colloidal particles of component (B) being characterized by an average unit particle size of at least 20 A. and up to about 5,000 A., said particles having formed in situ in said disperse system from metal-containing materials homogeneously dispersed in a single phase Newtonian overbased material characterized by a metal ratio of at least 1.1.

10. The composition of claim 9 wherein the solid metal-containing colloidal particles are further characterized by having a unit particle size of from about 20 A. to about 1000 A.

11. The composition of claim 1 with said disperse medium of component (B) being a combination of mineral oil and at least one other organic liquid miscible with the mineral oil.

12. The composition of claim 1 with the solid-metal containing particles of component (B) being selected from the class consisting of alkali and alkaline earth metal salts.

13. The composition of claim 12 wherein said third component comprises at least one member selected from the class consisting of alkali and alkaline earth metal salts of oil-soluble organic acids.

14. The composition of claim 12 wherein said third component consists essentially of at least one member selected from the class consisting of alkali and alkaline earth metal salts of oil-soluble sulfonic acids and carboxylic acids.

15. The composition of claim 14 wherein the salts of the oil-soluble sulfonic acids and carboxylic acids are alkaline earth metal salts.

16. The composition of claim 15 wherein the solid metal-containing colloidal particles are alkaline earth metal salts of inorganic acid materials.

17. The composition of claim 15 wherein the solid metal-containing colloidal particles are selected from the group consisting of alkaline earth metal acetates, formates, carbonates, hydrogen carbonates, hydrogen sulfides, sulfites, hydrogen sulfites, and chlorides.

18. The composition of claim 17 wherein said solid metal-containing colloidal particles are selected from the class consisting of calcium and barium carbonates and acetates.

19. The composition of claim 16 comprising (1) solid metal-containing colloidal particles consisting essentially of alkaline earth metal salts, these salts being characterized by an average unit particle size in the range of about 30 A. to about 400 A. and having been formed in situ, (2) said particles being predispersed in a dispersing medium comprising a solution of at least one non-mineral oil inert hydrocarbon liquid miscible with mineral oil and a mineral oil, and (3) as an essential third component, at least one organic compound which is soluble in the disperse medium and which is selected from the class consisting of alkaline earth metal salts of oil-soluble petrosulfonic acids, mono-, di-, and trialiphatic hydrocarbon substituted aryl sulfonic acids, and oil-soluble carboxylic acids, wherein said solid, metal-containing colloidal particles of (1) are selected from the class consisting of alkaline earth metal carbonates and hydrogen carbonates or mixtures thereof and these particles are present in an amount such that there is at least about 3.5 equivalents to about 19 equivalents of alkaline earth metal in the colloidal particles per equivalent of organic acid present in (3).

20. The composition of claim 1 with said third component of (B) being at least one organic compound which is soluble in said disperse medium, the molecules of said organic compound being characterized by a hydrophobic portion and at least one polar substituent excluding alkali and alkaline earth metal carboxylate and sulfonate groups.

21. The composition of claim 20 wherein said solid, metal-containing colloidal particles are selected from the group consisting of alkaline earth metal acetates, formates, carbonates, hydrogen carbonates, hydrogen sulfides, sulfites, hydrogen sulfites, and chlorides.

22. The composition of claim 13 wherein said solid, metal-containing colloidal particles of (1) are present in an amount such that there is at least about 3.5 equivalents of alkaline earth metal in the colloidal particles per equivalent of the oil-soluble organic acids of (3).

23. The composition of claim 22 wherein the metal-containing colloidal particles of (1) are selected from the group consisting of metal acetates, formates, carbonates, hydrogen carbonates, hydrogen sulfides, sulfites, hydrogen sulfites, and chlorides.

24. The composition of claim 1 wherein said isocyanate (A) is an aliphatic, alkylaromatic or aromatic polyisocyanate.

25. The composition of claim 1 wherein (A) is selected from the group consisting of: 2,4- and 2,6-toluene diisocyanate; 2,2'-, 2,4'-, and 4,4'-diphenylmethane-diisocyanate; triphenylmethane-triisocyanate; biphenyl diisocyanate; m- or p-phenylene-diisocyanate; 1,5-naphthalene-diisocyanate; isophorone-diisocyanate; 1,4-tetramethylene diisocyanate an hexamethylene diisocyanate.

26. The composition of claim 1 with at least one organic compound having two or more active hydrogen atoms admixed with said acid ester (C).

27. The composition of claim 26 wherein up to about 95% of the total hydroxyl equivalents provided by the mixture of said acid ester (C) and said organic compound having two or more active hydrogen atoms is contributed by said organic compound having two or more active hydrogen atoms.

28. A composition having separate components (A) and (B) capable of being reacted with each other comprising:
 (A) a composition comprising (A)(I) an organic polyfunctional isocyanate, and (A)(II) a non-Newtonian colloidal disperse system comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions; and
 (B) an acidic ester of a phosphoric acid, the organic portions of said acidic ester being selected from the group consisting of hydrocarbyloxy and hydroxy-substituted hydrocarbyloxy compounds.

29. The composition of claim 28 wherein the disperse medium of (A)(II) is an inert organic liquid, the essential third component is an alkaline earth metal salt of a sulfonic acid soluble in said liquid, and the organic portions of said acidic ester (B) are selected from the class consisting of aliphatic hydrocarbon-substituted aryloxy, aliphatic hydrocarbyloxy, hydroxy-substituted aliphatic hydrocarbyloxy, oxy radicals of copolymers of allyl alcohols and styrene.

30. The composition of claim 28 wherein the disperse medium of (A)(II) is an inert organic liquid, at least a portion being mineral oil, the essential third component is an oil-soluble alkaline earth metal salt selected from calcium and barium salts of oil-soluble sulfonic acids and the organic portions of said acidic ester (B) are selected from the class consisting of aliphatic hydrocarbon substituted-phenoxy radicals and oxy radicals of a copolymer of allyl alcohol and a styrene.

31. The composition of claim 36 wherein the aliphatic hydrocarbon substituents on said phenoxy radical is an olefin polymer substituent, said phenoxy radical having a molecular weight of up to about 5000.

32. The composition of claim 30 wherein said phenoxy radical is para-tertiary amylphenoxy.

33. The composition of claim 30 wherein the ratio of monomer units in said copolymer is about 1:1 and the molecular weight is about 1100 to about 1500.

34. The composition of claim 28 wherein the disperse medium of (A)(II) is mineral oil, the essential third component is a calcium petrosulfonate, and the organic portions of said acidic ester (B) are selected from the class consisting of aliphatic hydrocarbon-substituted phenoxy radicals and oxy radicals of a copolymer of allyl alcohol and styrene having the ratio of monomer units in said copolymer of about 1:1 and a molecular weight of about 1100 to about 1500.

35. The composition of claim 34 wherein the organic portions of said acidic ester are aliphatic hydrocarbon-substituted phenoxy radicals.

36. The composition of claim 28 with the solid metal-containing colloidal particles of component (A)(II) being characterized by an average unit particle size of at least 20 A. and up to about 5,000 A., said particles having formed in situ in said disperse system from metal-containing materials homogeneously dispersed in a single phase Newtonian overbased material characterized by a metal ratio of at least 1:1.

37. The composition of claim 36 wherein the solid metal-containing colloidal particles are further characterized by having a unit particle size of from about 20 A. to about 1100 A.

38. The composition of claim 28 with said disperse medium of component (A)(II) being a combination of mineral oil and at least one other organic liquid miscible with the mineral oil.

39. The composition of claim 28 with the solid-metal containing particles of component (A)(II) being selected from the class consisting of alkali and alkaline earth metal salts.

40. The composition of claim 39 wherein said third component comprises at least one member selected from the class consisting of alkali and alkaline earth metal salts of oil-soluble organic acids.

41. The composition of claim 39 wherein said third component consists essentially of at least one member selected from the class consisting of alkali and alkaline earth metal salts of oil-soluble sulfonic acids and carboxylic acids.

42. The composition of claim 41 wherein the salts of the oil-soluble sulfonic acids and carboxylic acids are alkaline earth metal salts.

43. The composition of claim 42 wherein the solid metal-containing colloidal particles are alkaline earth metal salts of inorganic acid materials.

44. The composition of claim 42 wherein the solid metal-containing colloidal particles are selected from the group consisting of alkaline earth metal acetates, formates, carbonates, hydrogen carbonates, hydrogen sulfides, sulfites, hydrogen sulfites, and chlorides.

45. The composition of claim 44 wherein said solid metal-containing colloidal particles are selected from the class consisting of calcium and barium carbonates and acetates.

46. The composition of claim 40 comprising (1) solid metal-containing colloidal particles consisting essentially of alkaline earth metal salts, these salts being characterized by an average unit particle size in the range of about 30 A. to about 400 A. and having been formed in situ, (2) said particles being predispersed in a dispersing medium comprising a solution of at least one non-mineral oil inert hydrocarbon liquid miscible with mineral oil and a mineral oil, and (3) as an essential third component, at least one organic compound which is soluble in the disperse medium and which is selected from the class consisting of alkaline earth metal salts of oil-soluble petrosulfonic acids, mono-, di-, and trialiphatic hydrocarbon substituted aryl sulfonic acids, and oil-soluble carboxylic acids, wherein said solid, metal-containing colloidal particles of (1) are selected from the class consisting of alkaline earth metal carbonates and hydrogen carbonates or mixtures thereof and these particles are present in an amount such that there is at least about 3.5 equivalents to about 19 equivalents of alkaline earth metal in the colloidal particles per equivalent of organic acid present in (3).

47. The composition of claim 28 with said third component of (A)(II) being at least one organic compound which is soluble in said disperse medium, the molecules of said organic compound being characterized by a hydrophobic portion and at least one polar substituent excluding alkali and alkaline earth metal carboxylate and sulfonate groups.

48. The composition of claim 47 wherein said solid, metal-containing colloidal particles are selected from the group consisting of alkaline earth metal acetates, formates, carbonates, hydrogen carbonates, hydrogen sulfides, sulfites, hydrogen sulfites, and chlorides.

49. The composition of claim 40 wherein said solid, metal-containing colloidal particles of (1) are present in an amount such that there is at least about 3.5 equivalents of alkaline earth metal in the colloidal particles per equivalent of the oil-soluble organic acids of (3).

50. The composition of claim 49 wherein the metal-containing colloidal particles of (1) are selected from the group consisting of metal acetates, formates, carbonates, hydrogen carbonates, hydrogen sulfides, sulfites, hydrogen sulfites, and chlorides.

51. The composition of claim 28 wherein said isocyanate (A)(I) is an aliphatic, alkylaromatic or aromatic polyisocyanate.

52. The composition of claim 31 wherein (A)(I) is selected from the group consisting of: 2,4- and 2,6-toluene diisocyanate; 2,2'-, 2,4'-, and 4,4'-diphenylmethane-diisocyanate; triphenylmethane-triisocyanate; biphenyl diisocyanate; m- or p-phenylene-diisocyanate; 1,5-naphthalene-diisocyanate; isophorone-diisocyanate; 1,4-tetramethylene diisocyanate and hexamethylene diisocyanate.

53. The composition of claim 28 with at least one organic compound having two or more active hydrogen atoms admixed with component (B).

54. A composition having separate components (A) and (B) capable of being reacted with each other comprising:
(A) an organic polyfunctional isocyanate; and
(B) a composition comprising (B)(I) a non-Newtonian colloidal disperse system comprising (1) solid metal-containing colloidal particles predispersed in (2) a disperse medium of at least one inert organic liquid and (3) as an essential third component at least one member selected from the class consisting of organic compounds which are substantially soluble in said disperse medium, the molecules of said organic compound being characterized by polar substituents and hydrophobic portions, and (B)(II) an acidic ester of a phosphoric acid, the organic portions of said acidic ester being selected from the group consisting of hydrocarbyloxy and hydroxy-substituted hydrocarbyloxy compounds.

55. The composition of claim 54 wherein the disperse medium of (B)(I) is an inert organic liquid, the essential third component is an alkaline earth metal salt of a sulfonic acid soluble in said liquid, and the organic portions of said acidic ester (B)(II) are selected from the class consisting of aliphatic hydrocarbon-substituted aryloxy, aliphatic hydrocarbyloxy, hydroxy-substituted aliphatic hydrocarbyloxy, oxy radicals of copolymers of allyl alcohols and styrene.

56. The composition of claim 54 wherein the disperse medium of (B)(I) is an inert organic liquid, at least a portion being mineral oil, the essential third component is an oil-soluble alkaline earth metal salt selected from calcium and barium salts of oil-soluble sulfonic acids and the organic portions of said acidic ester (B)(II) are selected from the class consisting of aliphatic hydrocarbon substituted-phenoxy radicals and oxy radicals of a copolymer of allyl alcohol and a styrene.

57. The composition of claim 56 wherein the aliphatic hydrocarbon substituents on said phenoxy radical is an olefin polymer substituent, said phenoxy radical having a molecular weight of up to about 5000.

58. The composition of claim 56 wherein said phenoxy radical is para-tertiary amylphenoxy.

59. The composition of claim 56 wherein the ratio of monomer units in said copolymer is about 1:1 and the molecular weight is about 1100 to about 1500.

60. The composition of claim 54 wherein the disperse medium of (B)(I) is mineral oil, the essential third component is a calcium petrosulfonate, and the organic portions of said acidic ester (B)(II) are selected from the class consisting of aliphatic hydrocarbon-substituted phenoxy radicals and oxy radicals of a copolymer of allyl alcohol and styrene having the ratio of monomer units in said copolymer of about 1:1 and a molecular weight of about 1100 to about 1500.

61. The composition of claim 60 wherein the organic portions of said acidic ester are aliphatic hydrocarbon-substituted phenoxy radicals.

62. The composition of claim 60 with the solid metal-containing colloidal particles of component (B)(I) being characterized by an average unit particle size of at least 20 A. and up to about 5,000 A., said particles having formed in situ in said disperse system from metal-containing materials homogeneously dispersed in a single phase Newtonian overbased material characterized by a metal ratio of at least 1.1.

63. The composition of claim 62 wherein the solid metal-containing colloidal particles are further characterized by having a unit particle size of from about 20 A. to about 1000 A.

64. The composition of claim 54 with said disperse medium of component (B)(I) being a combination of mineral oil and at least one other organic liquid miscible with the mineral oil.

65. The composition of claim 54 with the solid-metal containing particles of component (B)(I) being selected from the class consisting of alkali and alkaline earth metal salts.

66. The composition of claim 65 wherein said third component comprises at least one member selected from the class consisting of alkali and alkaline earth metal salts of oil-soluble organic acids.

67. The composition of claim 65 wherein said third component consists essentially of at least one member selected from the class consisting of alkali and alkaline earth metal salts of oil-soluble sulfonic acids and carboxylic acids.

68. The composition of claim 67 wherein the salts of the oil-soluble sulfonic acids and carboxylic acids are alkaline earth metal salts.

69. The composition of claim 68 wherein the solid metal-containing colloidal particles are alkaline earth metal salts of inorganic acid materials.

70. The composition of claim 68 wherein the solid metal-containing colloidal particles are selected from the group consisting of alkaline earth metal acetates, formates, carbonates, hydrogen carbonates, hydrogen sulfides, sulfites, hydrogen sulfites, and chlorides.

71. The composition of claim 70 wherein said solid metal-containing colloidal particles are selected from the class consisting of calcium and barium carbonates and acetates.

72. The composition of claim 69 comprising (1) solid metal-containing colloidal particles consisting essentially of alkaline earth metal salts, these salts being characterized by an average unit particle size in the range of about 30 A. to about 400 A. and having been formed in situ, (2) said particles being predispersed in a dispersing medium comprising a solution of at least one non-mineral oil inert hydrocarbon liquid miscible with mineral oil and a mineral oil, and (3) as an essential third component, at least one organic compound which is soluble in the disperse medium and which is selected from the class consisting of alkaline earth metal salts of oil-soluble petrosulfonic acids, mono-, di-, and trialiphatic hydrocarbon substituted aryl sulfonic acids, and oil-soluble carboxylic acids, wherein said solid, metal-containing colloidal particles of (1) are selected from the class consisting of alkaline earth metal carbonates and hydrogen carbonates or mixtures thereof and these particles are present in an amount such that there is at least about 3.5 equivalents to about 19 equivalents of alkaline earth metal in the colloidal particles per equivalent of organic acid present in (3).

73. The composition of claim 1 with said third component of (B)(I) being at least one organic compound which is soluble in said disperse medium, and molecules of said organic compound being characterized by a hydrophobic portion and at least one polar substituent excluding alkali and alkaline earth metal carboxylate and sulfonate groups.

74. The composition of claim 73 wherein said solid, metal-containing colloidal particles are selected from the group consisting of alkaline earth metal acetates, formates, carbonates, hydrogen carbonates, hydrogen sulfides, sulfites, hydrogen sulfites, and chlorides.

75. The composition of claim 66 wherein said solid, metal-containing colloidal particles of (1) are present in an amount such that there is at least about 3.5 equivalents of alkaline earth metal in the colloidal particles per equivalent of the oil-soluble organic acids of (3).

76. The composition of claim 75 wherein the metal-containing colloidal particles of (1) are selected from the group consisting of metal acetates, formates, carbonates, hydrogen carbonates, hydrogen sulfides, sulfites, hydrogen sulfites, and chlorides.

77. The composition of claim 54 wherein said isocyanate (A) is an aliphatic, alkylaromatic or aromatic polyisocyanate.

78. The composition of claim 54 wherein (A) is selected from the group consisting of: 2,4- and 2,6-toluene diisocyanate; 2,2'-, 2,4'-, and 4,4'-diphenylmethane-diisocyanate; triphenylmethane-triisocyanate; biphenyl diisocyanate; m- or p-phenylene-diisocyanate; 1,5-naphthalene-diisocyanate; isophorone-diisocyanate; 1,4-tetramethylene diisocyanate an hexamethylene diisocyanate.

79. The composition of claim 54 with at least one organic compound having two or more active hydrogen atoms admixed with component (B).

* * * * *